United States Patent
Jenks

(10) Patent No.: US 10,921,013 B2
(45) Date of Patent: Feb. 16, 2021

(54) ACTUATOR WITH STROKE DISPLACEMENT SETTING VIA A STROKE LIMITING ATTACHMENT

(71) Applicant: Johnson Controls Technology Company, Auburn Hills, MI (US)

(72) Inventor: Russell T. Jenks, Racine, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/455,039

(22) Filed: Jun. 27, 2019

(65) Prior Publication Data
US 2020/0408435 A1    Dec. 31, 2020

(51) Int. Cl.
| | | |
|---|---|---|
| *H02P 1/00* | (2006.01) | |
| *F24F 11/84* | (2018.01) | |
| *F16K 31/04* | (2006.01) | |
| *F15B 9/17* | (2006.01) | |

(52) U.S. Cl.
CPC ............... *F24F 11/84* (2018.01); *F15B 9/17* (2013.01); *F16K 31/04* (2013.01)

(58) Field of Classification Search
CPC ........................................................ H02P 6/18
See application file for complete search history.

(56) References Cited

U.S. PATENT DOCUMENTS

| | | | |
|---|---|---|---|
| 9,465,370 B2 | 10/2016 | Alexander et al. | |
| 2008/0246568 A1* | 10/2008 | Martin | ............... H01F 7/1607 335/255 |
| 2018/0094736 A1 | 4/2018 | Clement et al. | |

OTHER PUBLICATIONS

U.S. Appl. No. 16/261,498, filed Jan. 29, 2019, Jenks.
Specification on NIMOFR04C, Date created Dec. 2, 2016, Belimo Aircontrols (USA), Inc.

* cited by examiner

*Primary Examiner* — Karen Masih
(74) *Attorney, Agent, or Firm* — Foley & Lardner LLP

(57) ABSTRACT

An actuator includes an actuator housing having a first engagement feature and a motor located within the actuator housing and configured to rotate a driver. The actuator also includes a stroke limiting component coupled to the driver and has a second engagement feature. One of the first and second engagement features is a channel and another of the first and second engagement features is a protrusion. The protrusion is configured to fit within the channel to define a stroke of the actuator based at least in part on a length of the channel or a length of the protrusion.

21 Claims, 17 Drawing Sheets

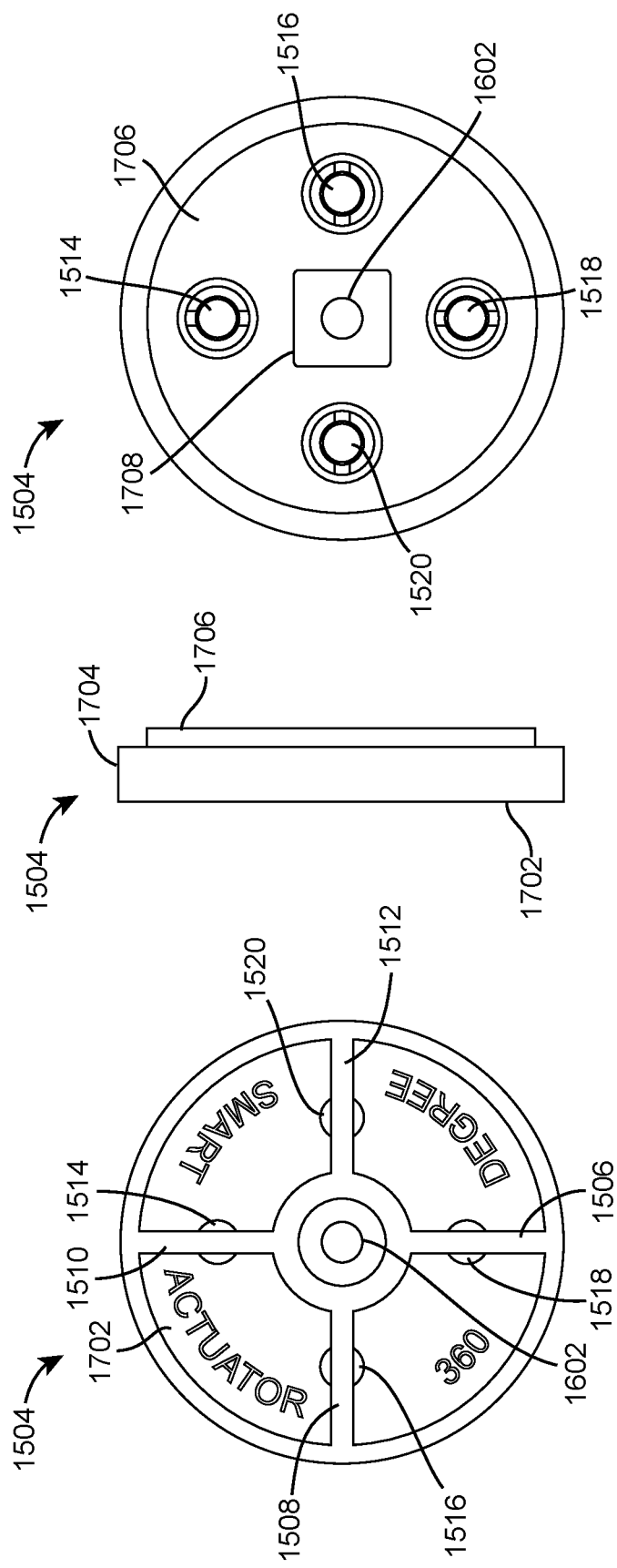

ACTUATOR WITH STROKE DISPLACEMENT SETTING VIA A STROKE LIMITING ATTACHMENT

BACKGROUND

The present disclosure relates generally to actuators in a heating, ventilating, or air conditioning (HVAC) system and more particularly to systems and methods for controlling the stroke of an actuator with an external stroke limiting component.

Actuators are used to operate a wide variety of HVAC components, such as air dampers, fluid valves, air handling units, and other components that are typically used in HVAC systems. Actuators typically operate within a range called the stroke length of the actuator that indicates a difference between an open and a closed position of the actuator. The stroke length of typical actuators is generally controlled by end stops that are located within the actuator. The end stops may be located on separate components that move or rotate as the actuator operates. The actuator may stop or reverse operation if the end stops contact each other. Unfortunately, in typical actuators, the stroke of each actuator is specific to the actuator and may not be easily changed. Consequently, manufacturing plants may need to manufacture actuators specific to each stroke length and each actuator may only be able to operate in specific situations.

SUMMARY

In one implementation of the present disclosure, an actuator is provided. The actuator may have an actuator housing having a first engagement feature; a driver; a motor located within the actuator housing and configured to rotate the driver; and a stroke limiting component coupled to the driver and having a second engagement feature. One of the first and second engagement features may be a channel and another of the first and second engagement features may be a protrusion, the protrusion may be configured to fit within the channel to define a stroke of the actuator based at least in part on a length of the channel.

In some embodiments, the stroke limiting component may be removably coupled to the driver.

In some embodiments, the first engagement feature is located on an exterior face of the actuator housing.

In some embodiments, the stroke limiting component may have a first face having a first channel having a first length associated with a first stroke and a second face having a second channel having a second length associated with a second stroke, wherein the first length is different from the second length.

In some embodiments, the first face may be associated with a 270-degree stroke and the second face may be associated with a 90-degree stroke.

In some embodiments, the channel may be arcuate.

In some embodiments, the stroke limiting component may permit the driver to rotate between a first end position in which the protrusion contacts a first end surface of the channel and a second end position in which the protrusion contacts a second end surface of the channel.

In some embodiments, the stroke is defined based on a face of the protrusion contacting a first end surface of the channel or a second end surface of the channel as the stroke limiting component rotates.

In some embodiments, the actuator further includes an actuator controller operationally coupled to the motor and including a processor and a memory, the memory storing instructions that, when executed by the processor, cause the processor to perform operations to control an orientation of the stroke limiting component. The operations may include receiving data from a sensor located within the actuator housing indicating when the first end surface or the second end surface contacts the protrusion during a rotation of the stroke limiting component; and, in response to the first end surface or the second end surface of the channel contacting the protrusion, rotating the stroke limiting component in an opposite direction.

In some embodiments, an orientation of the stroke limiting component represents an output actuator orientation.

In another implementation, an actuator is described. The actuator may include an actuator housing; a driver; a motor internally coupled to the actuator housing and the driver and configured to adjust a position of the driver; a circular disk operationally coupled to the motor and configured to rotate in relation to an operation of the motor and the position of the driver, wherein the circular disk may includes one or more markers; one or more sensors coupled to the actuator housing and configured to detect a position of the one or more markers; and an actuator controller operationally coupled to the motor and configured to adjust operation of the motor to adjust the position of the driver. The actuator controller may include a processor and a memory, the memory storing instructions that, when executed by the processor, cause the processor to perform operations to control an orientation of the circular disk, the operations including receiving output actuator orientation data from the one or more sensors based on an orientation of the circular disk; determining a rotation distance between an actuator output orientation and a target actuator orientation based on the output actuator orientation data; and rotating the circular disk based on the rotation distance.

In some embodiments, the one or more sensors are Hall effect sensors and the actuator may further includes magnets coupled to the circular disk, wherein determining the rotation distance between the actuator output orientation and the target actuator orientation may be based on a distance between the magnets and the Hall effect sensors.

In some embodiments, the one or more sensors may be coupled to the actuator housing in a radial pattern at 90-degree increments.

In some embodiments, the circular disk may be configured to rotate by greater than 360 degrees.

In some embodiments, the operations may further include receiving an input indicating a stroke limit, and rotating the circular disk circular disk to the stroke limit.

In some embodiments, the operations may further include receiving an input indicating a stroke limit of the actuator; and automatically reversing rotation of the circular disk when the one or more sensors indicate the circular disk is at the stroke limit.

In some embodiments, the actuator may further include a screw operationally coupled to the motor. The operations may further include operating the motor to rotate the screw corresponding to a rotation of the circular disk.

In another implementation, a system is described. The system may include an actuator and a plurality of interchangeable stroke limiting disks. Each stroke limiting disk of the plurality of interchangeable stroke limiting disks may be configured to couple to the face of the actuator and be configured to limit a stroke range of the actuator to a different stroke range.

In some embodiments, one stroke limiting disk of the plurality of stroke limiting disks may include a first face having a first channel having a first length configured to limit the stroke range of the actuator to a first stroke range; and a second face having a second channel having a second length configured to limit the stroke range of the actuator to a second stroke range, wherein the first length is different from the second length.

In some embodiments, the first face may be associated with a 270-degree stroke range and the second face may be associated with a 90-degree stroke range.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 17 is a front view of the position identifying component, according to some embodiments.

FIG. 18 is a side view of the position identifying component of FIG. 17, according to some embodiments.

FIG. 19 is a rear view of the position identifying component of FIG. 17, according to some embodiments.

DETAILED DESCRIPTION

Overview

Figure 1:
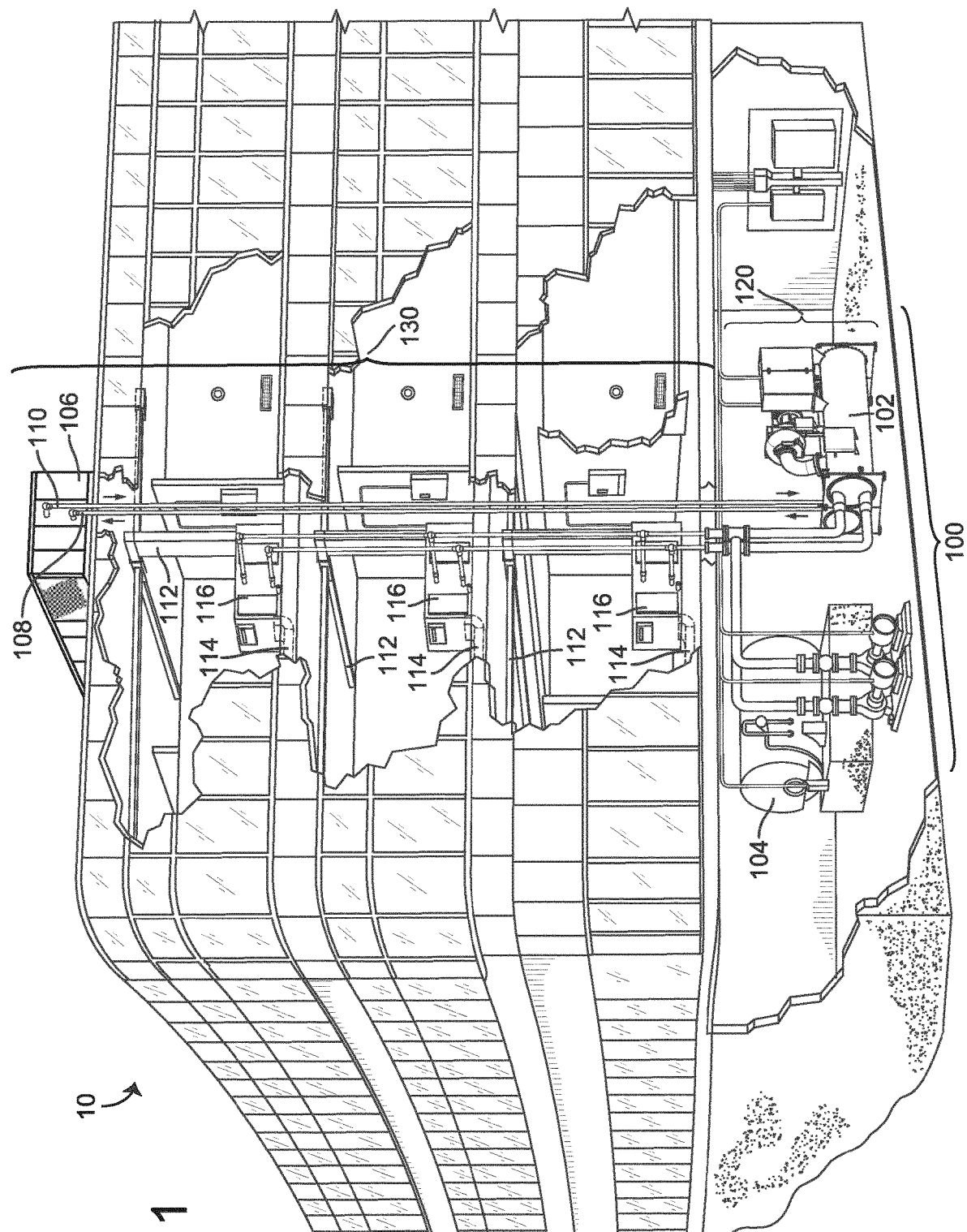
FIG. 1 is a drawing of a building equipped with a heating, ventilating, or air conditioning (HVAC) system and a building management system (BMS), according to some embodiments.

Referring generally to the FIGURES, systems and methods for controlling the stroke of an actuator using a stroke limiting component are shown, according to some embodiments. Actuators not utilizing the systems and methods described herein have a stroke that is generally controlled based on a hard stop fixed within the actuator. A gear of the actuator can have a corresponding stop that can contact the hard stop as the gear rotates. The contact between the stop and the hard stop can stop the actuator from rotating a member and consequently limit the stroke of an actuator to the possible rotation of the gear before the stops contact each other. Unfortunately, if an actuator malfunctions because the actuator is not operating with a desired stroke, an operator may have to replace the entire actuator. This can take up valuable resources and cause multiple other problems as the operator may not install a new actuator correctly. Further, another problem is these actuators may only be designed to have one stroke. Actuators not using the systems and methods described herein generally may not be repurposed to have a stroke for another purpose (e.g., moved to a valve or damper that requires a different stroke to operate) without taking apart the actuator and reconfiguring or replacing pieces internal to the actuator.

The systems and methods described herein permit an operator to interchange stroke limiting components without uninstalling or taking apart the actuator. The systems and methods provide for one or more stroke limiting components that couple to an external face of the actuator. The stroke limiting component can include a channel having end surfaces that protrude from the stroke limiting component. The stroke limiting component can be coupled to an actuator housing of the actuator so a protrusion of the actuator housing fits inside the channel. The stroke limiting component can be configured to rotate corresponding to a rotation of a positioning component (e.g., a driver used to move a valve or damper) that the actuator is driving. As the stroke limiting component rotates and the actuator reaches the end of its stroke, the end surfaces of the channel can contact a protrusion of the actuator housing. A sensor can sense the contact and send data to a controller operating the actuator indicating the contact. The controller can stop or reverse rotation of the positioning component based on the contact between the protrusion and the end surfaces.

The stroke limiting component can have multiple operational faces with different channel lengths that causes the actuator to operate at different strokes. If an actuator needs to be repurposed to control a different valve or damper with a different stroke, the operator can use a different face that has a different stroke to change the stroke of the actuator without taking apart or replacing the actuator.

In some embodiments, the stroke limiting component can be a 360-degree position identifying component including magnets (e.g., markers) that interact with sensors on various actuators. The sensors on the actuators can send data to a controller indicating a strength of the magnetic field generated by the magnets and the controller can identify a rotational position of the position identifying component based on the strength of the magnetic field. Further, the controller can determine a number of rotations of the position identifying component based on a constant flow of data from the sensors. The controller can determine whether the actuator is at the stroke limit based on the number of rotations the position identifying component has made and the determined current orientation of the position identifying component.

By using a 360-degree position identifying component, an actuator can operate a screw of a globe valve linkage that opens and closes a valve. A user can input a number of rotations it takes for a screw to push a stem to fully close the valve and set the stroke limit as the number of rotations. The controller can operate the actuator to open and close the valve based on the stroke limit set by the user.

The aspects described herein may increase the utility and the efficiency of the operation of actuators. For instance, as a result of the aspects described herein, in the event that an actuator having an incorrect stroke limit is installed onto a valve, rather than requiring an operator to manually replace the actuator with a new actuator or take apart the actuator to change parts, an operator can interchange stroke limiting components or flip the stroke limiting component to a surface with the correct stroke. This reduces the labor required to troubleshoot and correct any improper installation of the actuator. In addition, such actuators can be used in multiple settings even if the settings require differing stroke limits. For example, an actuator may control the orientation of a 90-degree ball valve. An operator may stop operation of the 90-degree ball valve and begin operating a 270-degree ball valve. The operator can disconnect the actuator controlling the orientation of the 90-degree ball valve and connect the actuator to the 270-degree by flipping a stroke limiting component of the actuator to set the actuator to a 270-degree stroke limit.

Further, the aspects described herein provide for a universal actuator that can be configured to fit and control valves of different stroke lengths. Consequently, manufacturers that manufacture the actuator may consolidate the process to create a single type of actuator that can operate with any stroke length. Further, management and distribution of the actuator may be made easier as only one type of actuator needs to be counted instead of needing to maintain counts for multiple actuators based on the stroke of each actuator. Finally, installation in the field may be made easier because technicians may only need to be trained to install a single type of actuator instead of installing different types of actuators based on the needed stroke.

Building Management System and HVAC System

Referring now to FIGS. 1-4, an exemplary building management system (BMS) and HVAC system in which the systems and methods of the present disclosure may be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve set point conditions for the building zone.

Figure 2:
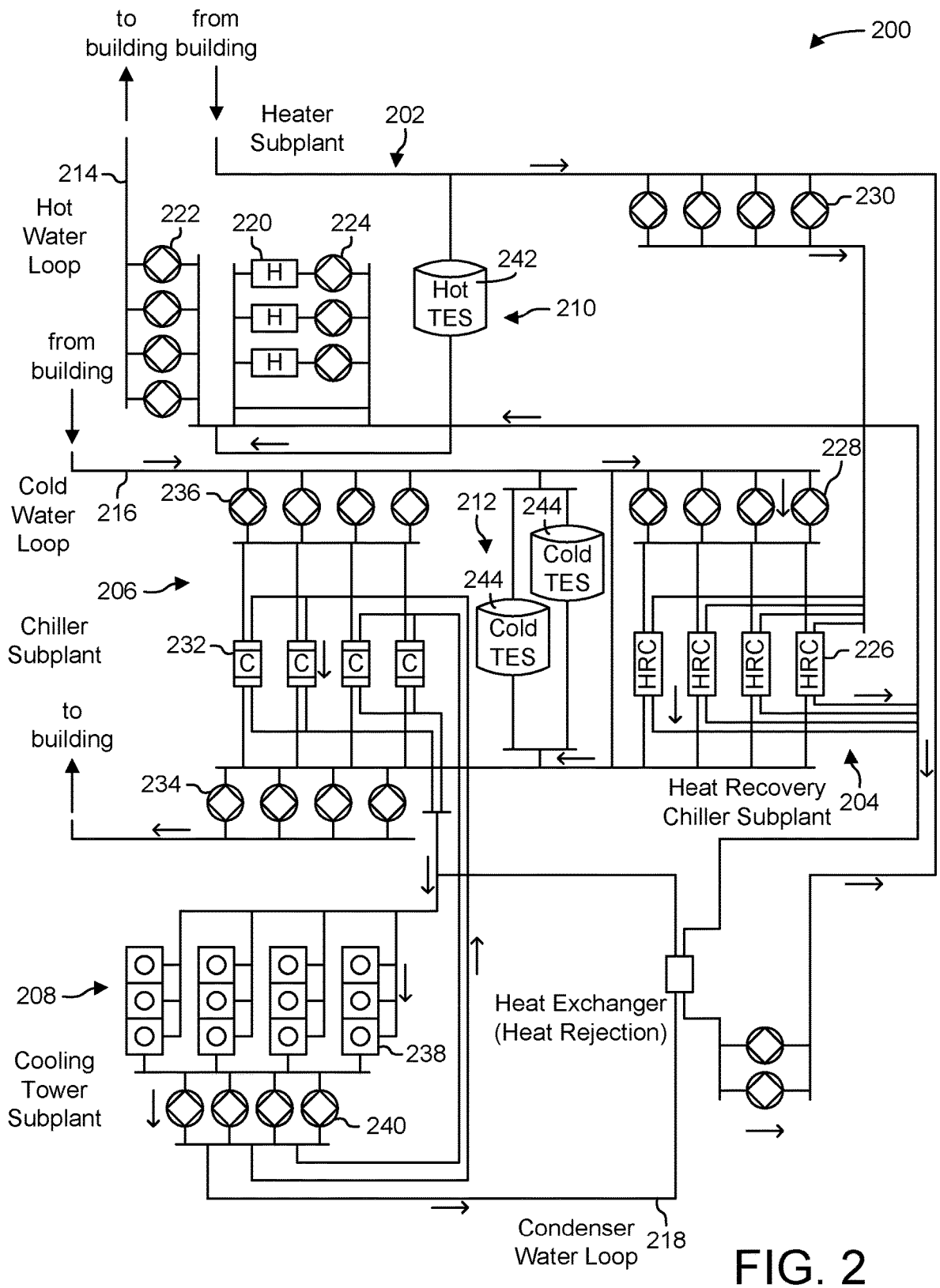
FIG. 2 is a schematic diagram of a waterside system which may be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
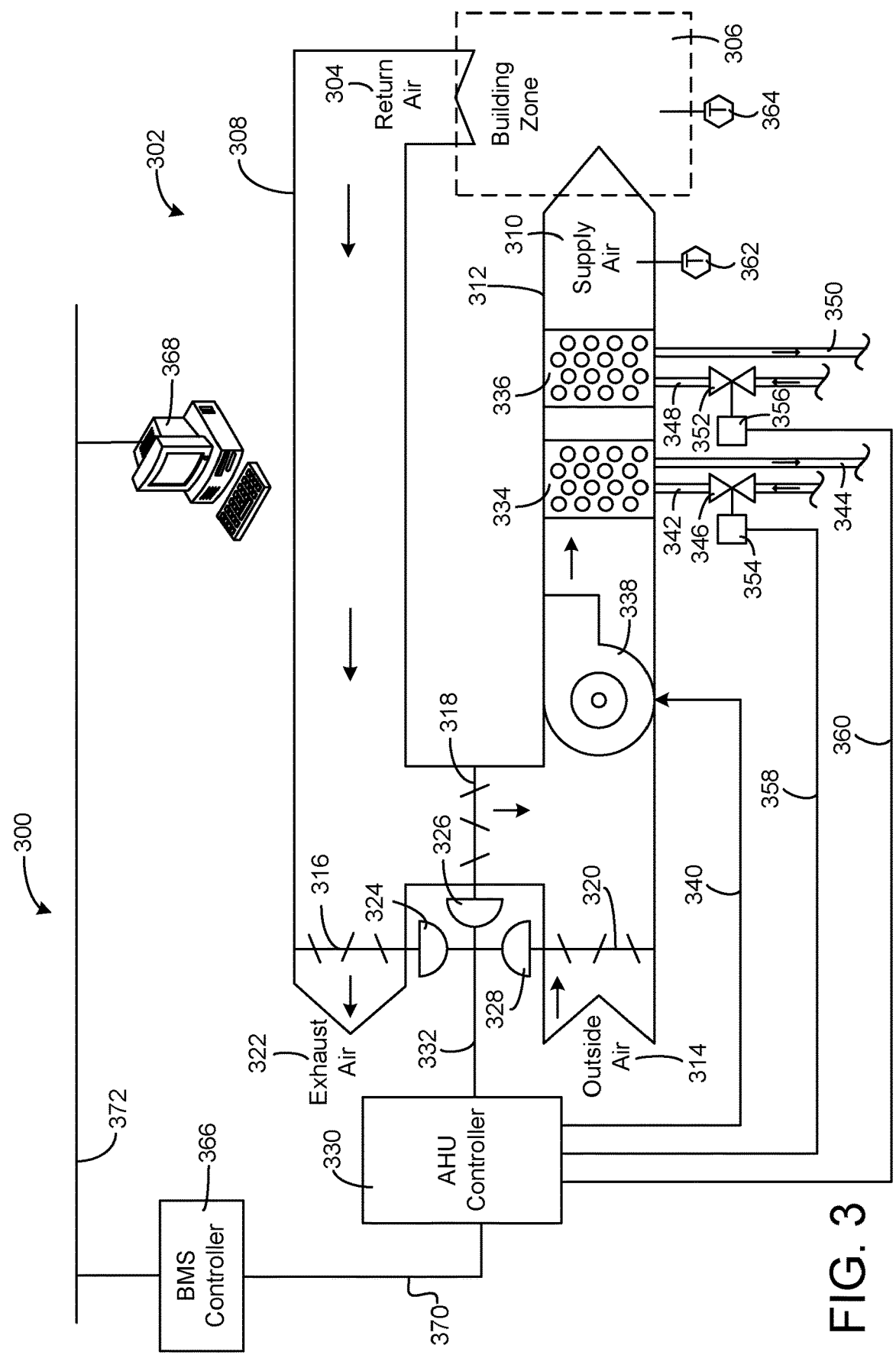
FIG. 3 is a block diagram of an airside system which may be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type AHU 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a BMS controller 366 and a client device 368. BMS controller 366 may include one or more computer systems (e.g., servers, supervisory controllers, subsystem controllers, etc.) that serve as system-level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
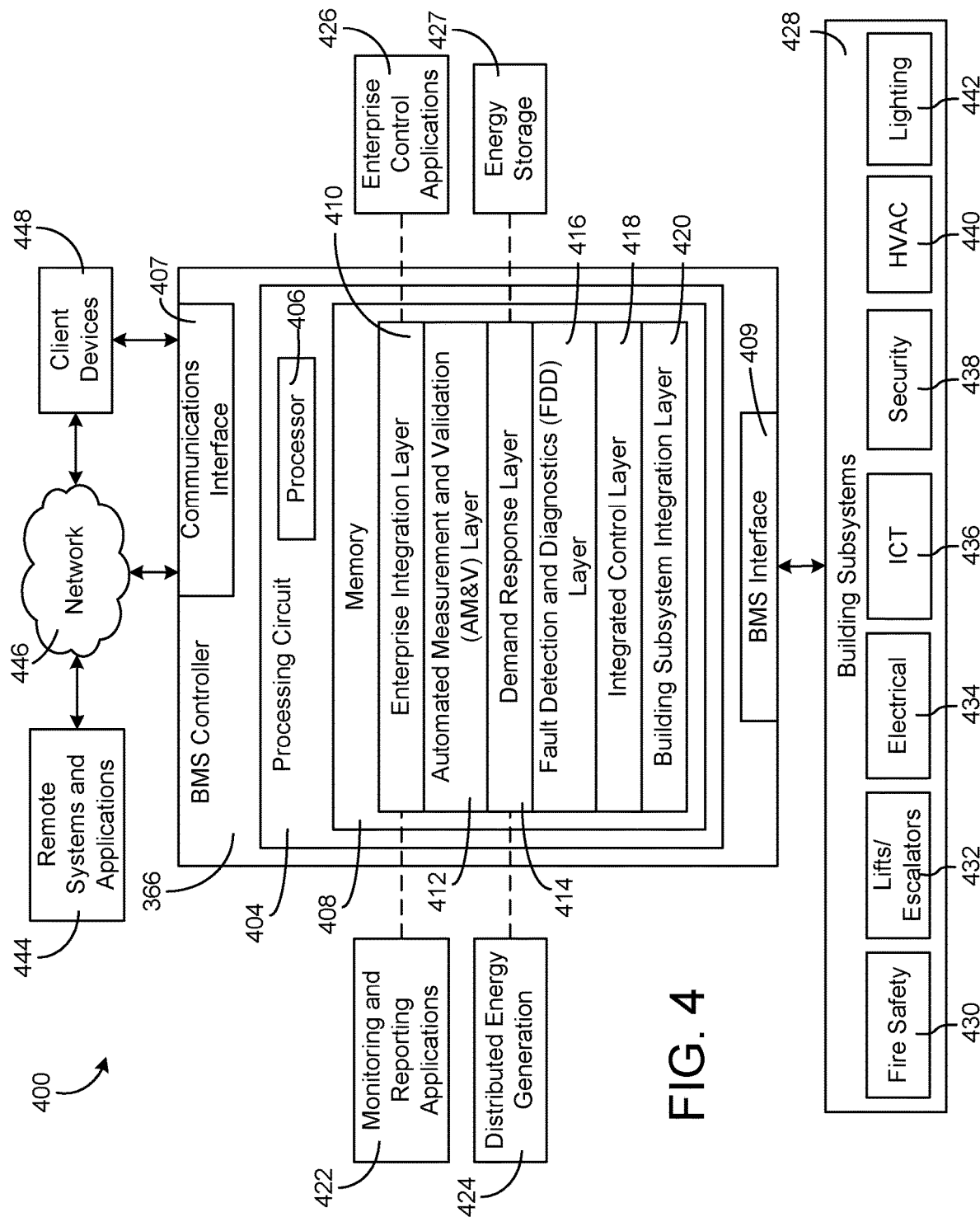
FIG. 4 is a block diagram of a BMS which may be implemented in the building of FIG. 1, according to some embodiments.

Referring now to FIG. 4, a block diagram of a BMS 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include any number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407 and 409 may be or may include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407 and 409 may be direct (e.g., local wired or wireless communications) or via a communications network 446 (e.g., a WAN, the Internet, a cellular network, etc.). For example, interfaces 407 and 409 may include an Ethernet card and port for sending and receiving data via an Ethernet-based communications link or network. In another example, interfaces 407 and 409 may include a WiFi transceiver for communicating via a wireless communications network. In another example, one or both of interfaces 407 and 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407 and 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 408 may be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments, BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Actuator Control System

Figure 5:
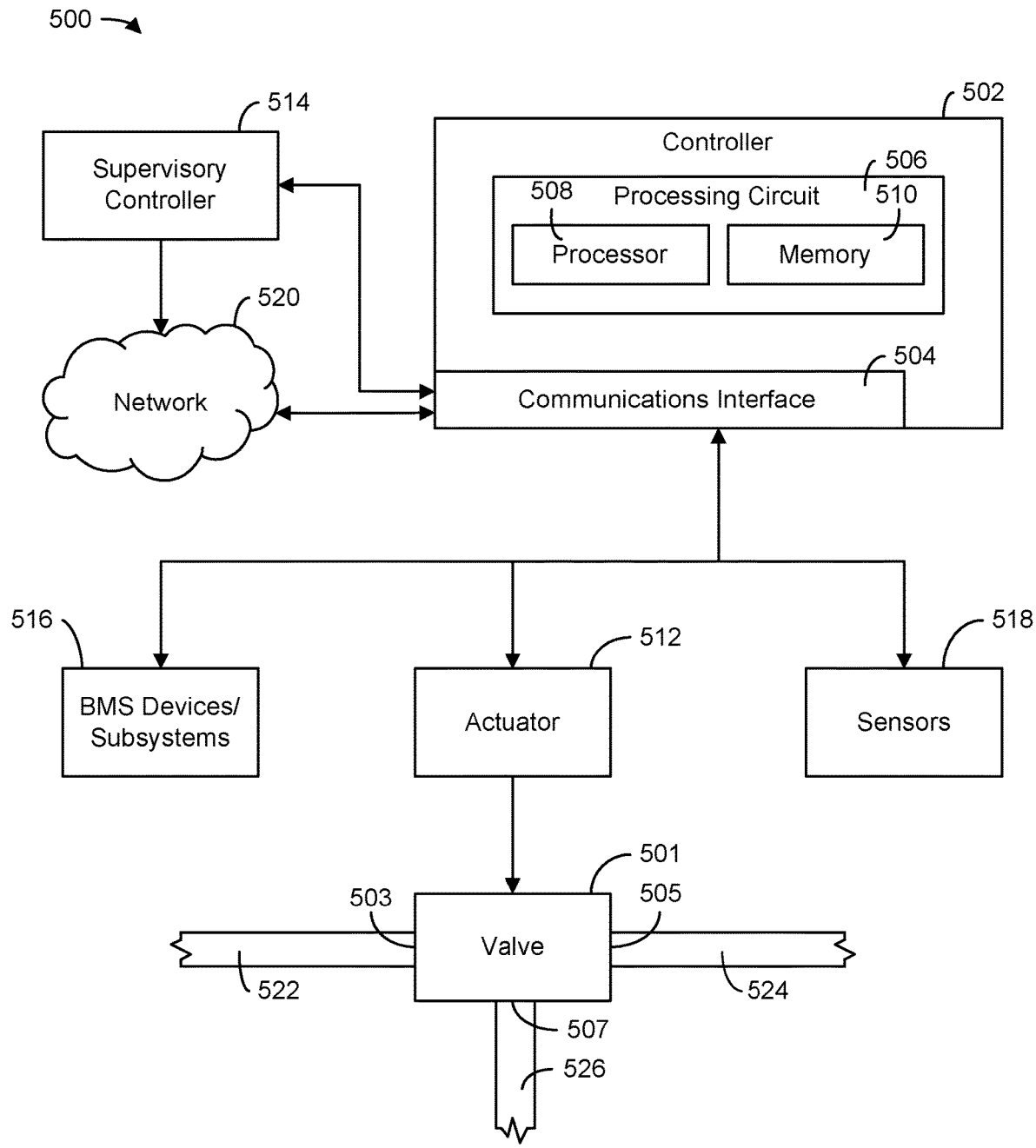
FIG. 5 is a block diagram of a system for controlling a valve using an actuator, according to some embodiments.

Referring now to FIG. 5, a block diagram of a control system 500 is shown, according to some embodiments. Control system 500 may be used to monitor and control any number of conditions, states, or variables of a controlled system (e.g., a building system, a plumbing system, an HVAC system, etc.) including, for example, the rotational position of a fluid control valve assembly 501.

In some embodiments, control system 500 is a local control system (e.g., local to a building, building zone, building system, etc.). In other embodiments, control system 500 is a distributed or remote control system. Control system 500 may be used to control a single device (e.g., valve assembly 501) or multiple devices (e.g., a chiller, boiler, air handling unit, damper, etc.). The devices may be located within a single building or building system or spread throughout several buildings or discrete building systems. In some embodiments, control system 500 is part of a comprehensive building automation system such as a METASYS® brand building automation system sold by Johnson Controls, Inc. In other embodiments, control system 500 is a local control system for one or more valves and/or other HVAC devices.

Control system 500 is shown to include a controller 502 having a communications interface 504 and a processing circuit 506. In some embodiments, controller 502 is the same as BMS controller 366, described above with reference to FIG. 3. Communications interface 504 may include wired or wireless interfaces (e.g., jacks, antennas, transmitters, receivers, transceivers, wire terminals, etc.) for conducting data communications with, for example, an actuator 512, a supervisory controller 514, BMS devices/subsystems 516, sensors 518, or other external devices or data sources. Data communications may be conducted via a direct connection (e.g., a wired connection, an ad-hoc wireless connection, etc.) or via a communications network 520 (e.g., an Internet connection, a LAN, WAN, or WLAN connection, etc.).

Communications interface 504 may be configured to receive control signals from supervisory controller 514 (e.g., specific operating instructions, setpoint instructions, etc), measurement signals from sensors 518, and/or other types of electronic data communications from various building management system (BMS) devices or subsystems 516. For example, communications interface 504 may receive measurement signals from sensors 518 indicating a state or condition (e.g., temperature, pressure, flow rate, etc.) of the fluids in pipelines 522-526. As shown in FIG. 5, pipelines 522, 524, and 526 may connect to ports 503, 505, and 507 of valve assembly 501, respectively.

Still referring to FIG. 5, controller 502 is shown to include a processing circuit 506 having a processor 508 and a memory 510. Processor 508 can be implemented as a general purpose processor, an application specific integrated circuit (ASIC), one or more field programmable gate arrays (FPGAs), a group of processing components, or other suitable electronic processing components. Memory 510 (e.g., memory device, memory unit, storage device, etc.) may include one or more devices (e.g., RAM, ROM, Flash memory, hard disk storage, etc.) for storing data and/or computer code for completing or facilitating the various processes, layers and modules described herein. Memory 510 may include volatile memory or non-volatile memory. Memory 510 may include database components, object code components, script components, or any other type of information structure for supporting the various activities and information structures described herein.

In some embodiments, controller 502 is a feedback loop controller (e.g., a proportional gain controller, a proportional-integral (PI) controller, a proportional-integral-derivative (PID) controller, and adaptive gain controller, a pattern recognition adaptive controller (PRAC), a model predictive controller, etc.) Controller 502 may be configured to monitor the fluids in pipelines 522-526 (e.g., using measurement signals received from sensors 518). Controller 502 may use the signals from sensors 518 to operate valve assembly 501 and to achieve a desired setpoint. For example, controller 502 may be configured to operate valve assembly 501 to achieve a temperature setpoint, a pressure setpoint, a flow rate setpoint, or any other type of setpoint received from supervisory controller 514 or from a user device (e.g., via network 520).

Controller 502 may be configured to automatically operate valve assembly 501 using an actuator 512. Actuator 512 may be rotatably coupled to a valve stem of fluid control valve assembly 501 and may be configured to cause a valve member (not shown) to rotate (e.g., by acting upon a valve stem). Actuator 512 may be any type of mechanism capable of acting upon valve assembly 501 to cause a rotation of the valve member. For example, actuator 512 may include an electric motor and a drive device that are operable in response to a control signal from controller 502 to cause a rotation of the valve member.

Actuator with External Stroke Limiting Component

Figure 6:
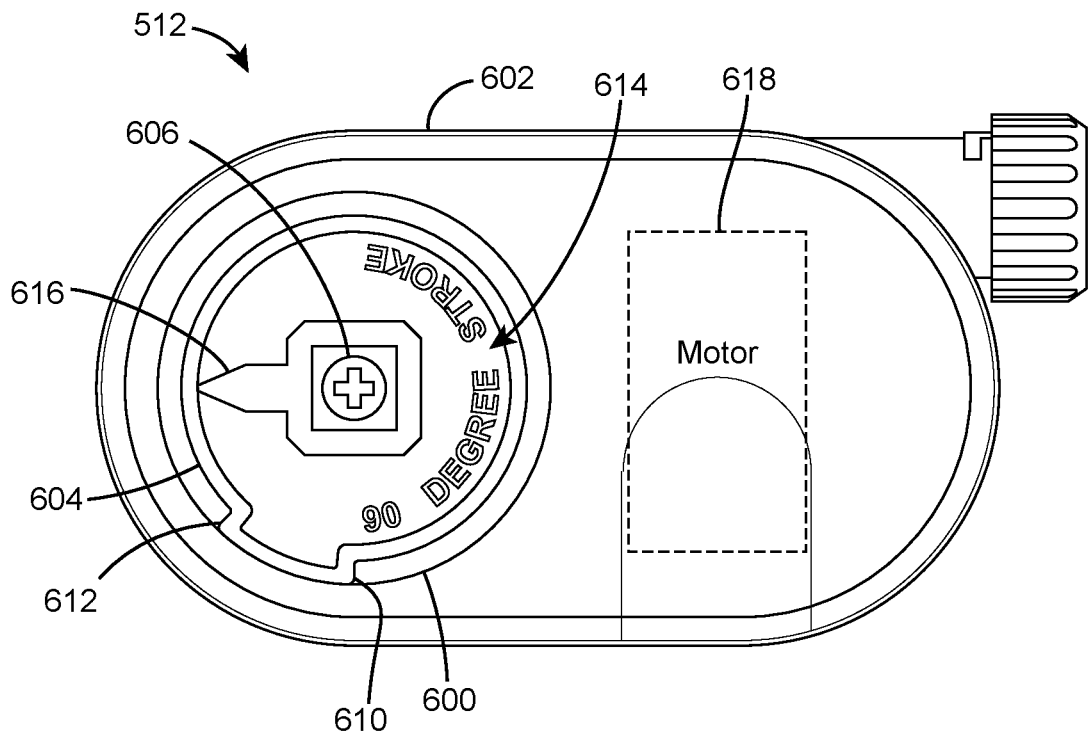
FIG. 6 is a front view of an actuator including a stroke limiting component, according to some embodiments.

Referring now to FIG. 6, a front view of actuator 512 is shown, according to some embodiments. In some implementations, actuator 512 may be used in HVAC system 100, waterside system 200, airside system 300, or BMS 400, as described with reference to FIGS. 1-4. For example, actuator 512 may be a damper actuator, a valve actuator, a fan actuator, a pump actuator, or any other type of actuator that may be used in an HVAC system or BMS. In various embodiments, actuator 512 may be a linear actuator (e.g., a linear proportional actuator), a non-linear actuator, a spring return actuator, a non-spring return actuator, etc. Actuator 512 is shown to include a stroke limiting component 604 coupled to an actuator housing 602 (e.g., an actuator body). Stroke limiting component 604 can be a substantially circular disk coupled to actuator housing 602 by a fastener 606. In various embodiments, fastener 606 may be a screw, a bolt, a pin, or a rod.

Actuator 512 can include a motor 618 located within the actuator housing 602. The motor 618 may be configured to move a valve from a current valve orientation towards a desired valve orientation within a conduit. In some embodiments, motor 618 may rotate the valve in predetermined steps. In such embodiments, motor 618 may be a stepper motor (though, in other various embodiments, the actuator 512 may include other types of motors). For instance, a full rotation of a rotor of motor 618 may be divided into a number of steps. From an initial position, motor 618 may rotate in the predetermined steps towards a full rotation. Where motor 618 rotates the full number of steps, motor 618 will have completed a full rotation. Such embodiments permit precise movement and control of motor 618. In addition, motor 618 may rotate valves by increments of, for example, 90 degrees. In other embodiments, motor 618 may be configured to rotate the valve in another increment of, for example, 15 degrees. In this way, it should be appreciated that motor 618 may be configured to move the valve by any predetermined increment.

Stroke limiting component 604 is shown to include a channel 608, end surfaces 610 and 612, a label 614, and a position indicator 616. Each of components 606-616 can be included on one or more faces of stroke limiting component 604. End surfaces 610 and 612 can extend from stroke limiting component 604 and represent the ends of channel 608 such that the protrusion of actuator housing 602 can contact the end surfaces 610 and 612 during a rotation of stroke limiting component 604. Position indicator 616 can represent a current position of actuator 512. Label 614 can identify a stroke of actuator 512 based on the installation orientation of stroke limiting component 604 as described below.

Stroke limiting component 604 be configured to rotate as motor 618 of actuator 512 rotates gears (e.g., a gear train) of actuator 512. Fastener 606 can be used to couple to stroke limiting component 604 to actuator housing 602 and provide a tensile force to keep stroke limiting component 604 coupled to actuator housing 602.

Stroke limiting component 604 can be configured to control a stroke of actuator 512 based on a length of channel 608. Channel 608 may be arcuate and positioned along an outside edge of stroke limiting component 604. Channel 608 may interact with a protrusion extending from actuator housing 602 (e.g., protrusion 706 shown and described in greater detail below with reference to FIG. 7). The stroke can represent an amount that actuator can rotate a driving component (e.g., driver 702 shown and described with greater detail below in reference to FIG. 7). As described herein, the stroke may be referenced as a stroke range or stroke limit. The longer the stroke of an actuator, the more the actuator is permitted to rotate. The channel 608 is shown to terminate in a first end surface 610 and a second end surface 612 (i.e., the channel 608 extends from a first end surface 610 to a second end surface 612). Stroke limiting component 604 can control the stroke of actuator 512 based on end surfaces 610 and 612 of stroke limiting component 604 contacting the protrusion of actuator housing 602. End surfaces 610 and 612 can extend from a face of stroke limiting component 604 and can have any suitable dimensions. Further, channel 608 can be sized so the protrusion fits into channel 608 and so channel 608 can slide over the protrusion as stroke limiting component 604 rotates. As stroke limiting component 604 rotates the protrusion may remain stationary. Stroke limiting component 604 can rotate until one of end surfaces 610 and 612 contact the protrusion. Stroke limiting component 604 can rotate in any direction (e.g., clockwise, counterclockwise). Either of end surfaces 610 and 612 can contact the protrusion.

In some embodiments, stroke limiting component 604 may include a protrusion and actuator housing 602 may include a channel. In such embodiments, the protrusion and the channel may act in the same or a similar manner to protrusion 706 and channel 608 to define a stroke of actuator 512. The protrusions and the channels of stroke limiting component 604 and actuator housing 602 may be engagement features.

In some embodiments, a controller (e.g., controller 502, a controller internal to actuator 512, etc.) can receive data from sensors indicating contact between one of end surfaces 610 and 612 and the protrusion in the actuator housing. When the controller receives data indicating contact between end surfaces 610 and 612 and the protrusion, the controller can cause motor 618 to rotate stroke limiting component 604 in the opposite direction or stop stroke limiting component 604 from rotating. For example, a controller operating motor 618 can receive data indicating a resistance to motor 618 rotating stroke limiting component 604. Motor 618 of actuator 512 can rotate stroke limiting component 604 in the opposite direction. In some embodiments, motor 618 can rotate stroke limiting component 604 in the opposite direction until one of end surfaces 610 and 612 contact the protrusion. The contact between end surfaces 610 and 612 can produce resistance data that sensors can send to the controller. The controller can transmit a signal for motor 618 to rotate stroke limiting component 604 in the previous direction.

Stroke limiting component 604 can have multiple operative faces. Each face can be associated with a different stroke for actuator 512. The faces can be associated with any stroke. For example, a first face of stroke limiting component 604 can have a length of a channel 608 that permits a 90-degree stroke when coupled to actuator housing 602. A second face of stroke limiting component 604 can have a channel 608 with a length that permits a 270-degree stroke when coupled to actuator housing 602. Stroke limiting component 604 can have any number of faces and corresponding strokes.

Stroke limiting component 604 is further shown to include a label 614. Label 614 can indicate a stroke of actuator 512 based on the orientation in which stroke limiting component 604 is currently coupled to actuator housing 602. For example, FIG. 6 shows label 614 identifying a "90-degree stroke." As configured, the 90-degree stroke can be based on the length of the channel 608 on the opposite face of stroke limiting component 604. In various embodiments, label 614 may be an extruded feature of stroke limiting component 604 (e.g., the characters comprising label 614 can be cut into or protrude from a face of the stroke limiting 604).

Stroke limiting component 604 is shown to include position indicator 616. Position indicator 616 can be representative of the current position of actuator 512 and of the component that actuator 512 is driving or controlling (e.g., valve or damper). In some embodiments, position indicator 616 can correspond to end surfaces on the opposite face of stroke limiting component 604 so an operator viewing stroke limiting component 604 can see an orientation of actuator 512 based on the relationship between the indicator 616 and the protrusion on actuator housing 602. Advantageously, by depicting the position of actuator 512, position indicator 616 can allow an operator installing stroke limiting component 604 or actuator 512 at a building site to couple stroke limiting component 604 to actuator housing 602 knowing the proper orientation of the stroke limiting component in relation to the protrusion. This minimizes the risk of an operator improperly installing actuator 512 or stroke limiting component 604, which may consequently require the operator to make a second trip to the building site to repair the improper installed actuator 512 or stroke limiting component 604.

Figure 7:
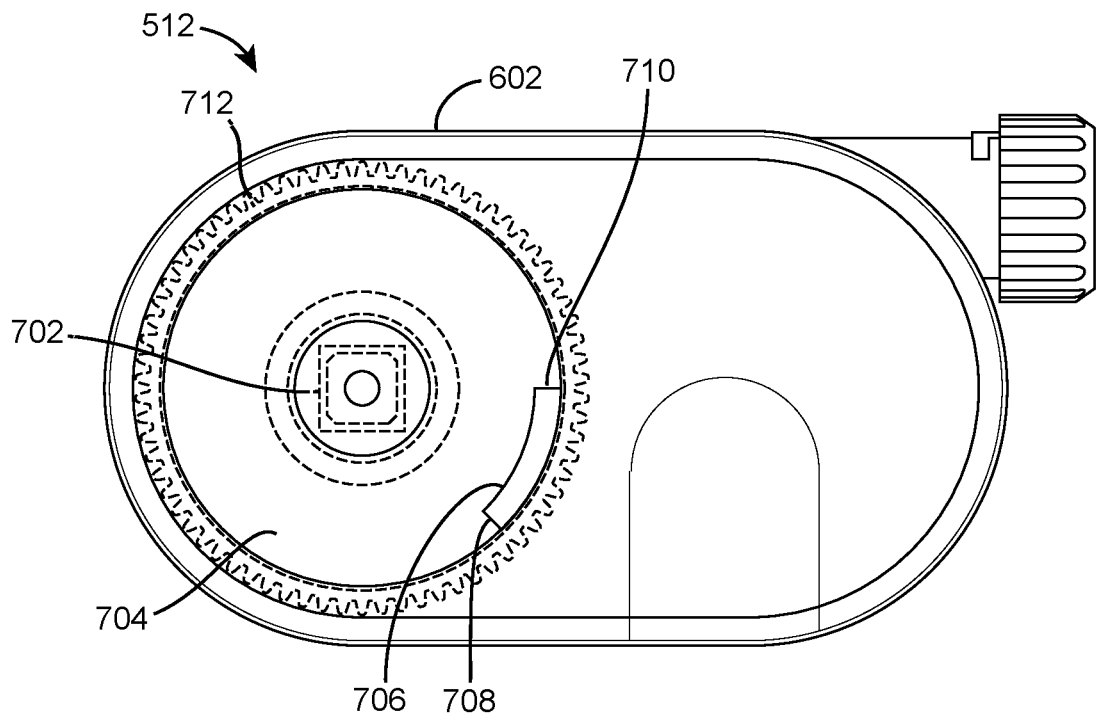
FIG. 7 is a front view of the actuator with the stroke limiting component removed, according to some embodiments.

Referring now to FIG. 7, a front view of actuator 512 without stroke limiting component 604 coupled to actuator housing 602 is shown, according to some embodiments. Actuator 512 is shown to include a driver 702, a recess 704, a protrusion 706, and a gear 712. Internal gear 712 can represent multiple gears that connect to motor 618 of actuator 512 (e.g., a gear train). Driver 702 can be operationally coupled to a gear within actuator housing 602. Driver 702 can rotate as motor 618 within the actuator rotates gear 712. Although not shown, stroke limiting component 604 can be coupled to driver 702 and fastener 606. Stroke limiting component 604 can rotate as driver 702 rotates.

By rotating gears of actuator 512, motor 618 can cause driver 702 to rotate at a rate proportional to the rotating gears. Stroke limiting component 604 can be coupled to one end of the driver 702 so stroke limiting component 604 can rotate at the same rate as driver 702. The end of the driver 702 opposite the stroke limiting component 604 may be configured to drive a component coupled to actuator 512 (e.g., a valve, a damper) to a target orientation or position. For example, driver 702 may be coupled to a valve stem in order to rotate a valve member between fully open and fully closed positions.

Protrusion 706 can be an extension from recess 704 of actuator housing 602. As shown, recess 704 may have a generally circular shape and may be sized to permit the free rotation of the stroke limiting component 604. Protrusion 706 may be substantially arcuate and have end surfaces 708 and 710. Protrusion 706 can be the same protrusion described above in reference to FIG. 6. In some embodiments, protrusion 706 can extend from an outside edge of recess 704. Protrusion 706 can be any size and any shape. In some embodiments, protrusion 706 can be sized to fit inside a channel of stroke limiting component 604 so the channel can rotate while the protrusion 706 remains stationary inside the channel. Because protrusion 706 extends from recess 704, at least one of end surfaces of the channel can contact one of end surfaces 708 and 710 of protrusion 706 as stroke limiting component 604 rotates.

A length of protrusion 706 can be associated with a stroke of actuator 512. The length of protrusion 706 can be defined as a distance between end surfaces 708 and 710 along an edge of protrusion 706. The stroke of actuator 512 can depend on the amount that stroke limiting component 604 can rotate before an end surface of stroke limiting component 604 contacts at least one of end surfaces 708 and 710 of protrusion 706. Consequently, in some instances, the larger the length of protrusion 706, the less stroke limiting component 604 can rotate and the smaller the stroke of actuator 512. Conversely, the smaller the length of protrusion 706, the more stroke limiting component 604 can rotate and the larger the stroke of actuator 512. An administrator can size lengths of protrusion 706 and channels of stroke limiting component 604 to obtain a desired stroke for actuator 512.

Figure 8:
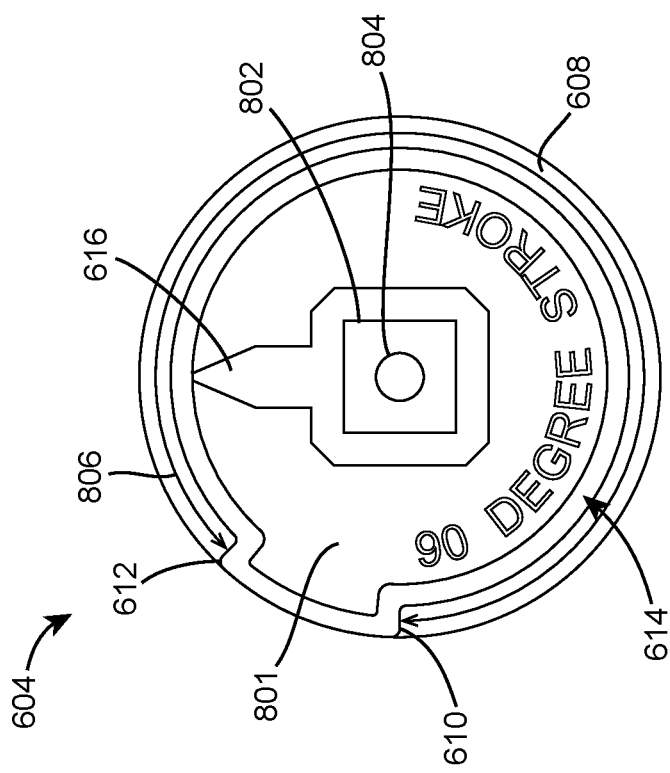
FIG. 8 is a front view of the stroke limiting component with a channel length that sets the actuator to operate at a 270-degree stroke, according to some embodiments.

Referring now to FIG. 8, a front view of stroke limiting component 604 is shown, according to some embodiments. Stroke limiting component 604 is shown to include a first face 801. First face 801 is shown to include channel 608 that extends a length 806 from end surface 610 to end surface

612. First face 801 further includes label 614, position indicator 616, a drive receiving recess 802 and a hole 804

Drive receiving recess 802 and hole 804 can cooperate to couple with driver 702, shown and described with reference to FIG. 7. Driver 702 can operationally couple stroke limiting component 604 to a gear of actuator 512 and a component (e.g., a valve or damper) that actuator 512 is positioning or orienting. Hole 804 can be sized so fastener 606 can slide through it and couple with a positioner internal to actuator 512 to keep stroke limiting component 604 coupled to actuator housing 602. Drive receiving recess 802 can be shaped and sized to hold and rotate as driver 702 rotates so stroke limiting component 604 rotates as driver 702 rotates. Stroke limiting component 604 can rotate as motor 618 drives driver 702 to rotate. Consequently, stroke limiting component 604 can rotate at a rate proportional to a movement or reorientation of a device that actuator 512 is moving or reorienting.

Figure 9:
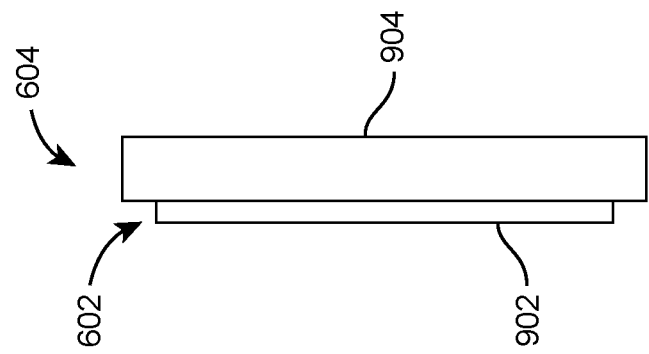
FIG. 9 is a side view of the stroke limiting component of FIG. 8, according to some embodiments.

Referring now to FIG. 9, a side view of stroke limiting component 604 is shown, according to some embodiments. Stroke limiting component 604 is shown to include an extension 902, a body 904, and channel 608. Extension 902 can represent a size of channel 608 that allows for protrusion 706 to slide inside channel 608. Extension 902 can also represent an extension distance that end surfaces 610 and 612, shown and described with reference to FIG. 6, extend away from body 904 to contact protrusion 706 as stroke limiting component 604 rotates. Extension 902 can extend any distance away from body 904.

Figure 10:
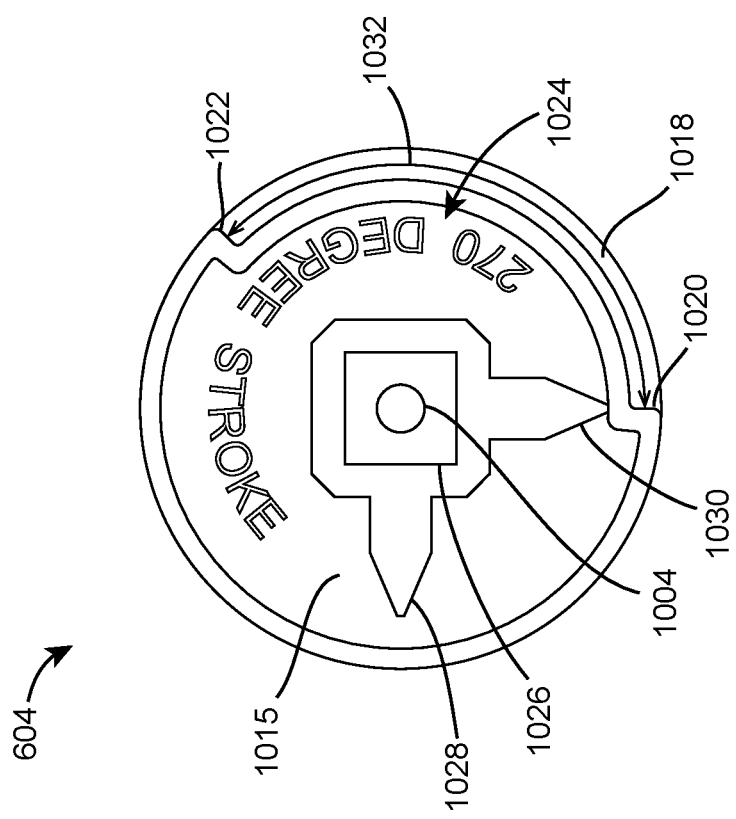
FIG. 10 is a rear view of the stroke limiting component of FIG. 8 with a channel length that sets the actuator to operate at a 90-degree stroke, according to some embodiments.

Referring now to FIG. 10, a rear view of stroke limiting component 604 is shown, according to some embodiments. Stroke limiting component 604 is shown to include a second face 1015 with a channel 1018, end surfaces 1020 and 1022, a label 1024, hole 1004, a drive receiving recess 1026, and position indicators 1028 and 1030. Each of components 1018-1030 can perform functions similar to corresponding components 608-614 on first face 1001.

Channel 1018 is shown to have a length 1032 between end surfaces 1020 to 1022 that is shorter than length 806 of channel 608, shown and described with reference to FIG. 8. When second face 1015 of stroke limiting component 604 is coupled to actuator housing 602 with protrusion 706 fitting into channel 1018, stroke limiting component 604 can rotate a shorter distance (e.g., 90 degrees) in either direction than when first face 801 is coupled to actuator housing 602 before one of end surfaces 1020 and 1022 contact protrusion 706.

In some embodiments, as indicated by label 1024, when first face 801 of stroke limiting component 604 is coupled to actuator housing 602, second face 1015 may face away from actuator housing 602 and actuator 512 can operate at a 270-degree stroke. Label 1024 can indicate the 270-degree stroke so an operator can see the stroke being implemented as stroke limiting component 604 is coupled to actuator housing 602. When second face 1001 is coupled to actuator 512, actuator 512 can have a stroke of 90 degrees as indicated by length 1032. Faces 801 and 1001 can be interchangeable in order to modify the stroke of the actuator 512. For example, an operator can couple first face 801 to actuator housing 602 to set the stroke of the actuator 512 to 270 degrees. To change the stroke from 270 degrees to 90 degrees, the operator can remove stroke limiting component 604 from actuator housing 602 and flip the stoke limiting component 604 over to couple second face 1015 to actuator housing 602. Advantageously, stroke limiting component 604 can have any number of faces. If an actuator needs to serve different functions that require different strokes at different times, an operator can take off and rotate (e.g., flip) stroke limiting component 604 to a face associated with a desired stroke and couple the face to actuator 512 without changing internal actuator components or replacing actuator 512.

Figure 11:
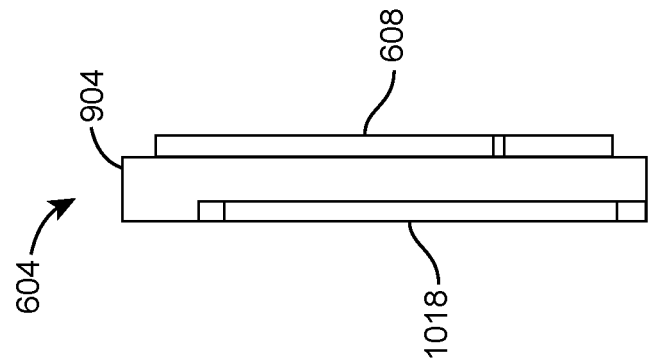
FIG. 11 is another side view of the stroke limiting component of FIG. 8, according to some embodiments.

Referring now to FIG. 11, another side view of stroke limiting component 604 is shown, according to some embodiments. Stroke limiting component 604 is shown to include a body 904 and channels 608 and 1018. As described above, channels 608 and 1018 may each correspond to a different stroke. Stroke limiting component 604 can be flipped and coupled to the actuator body (e.g., by directly coupling to driver 702) based on a desired stroke for the application of the actuator. Accordingly, stroke limiting component 604 can be removably coupled to the driver 702.

Figure 12:
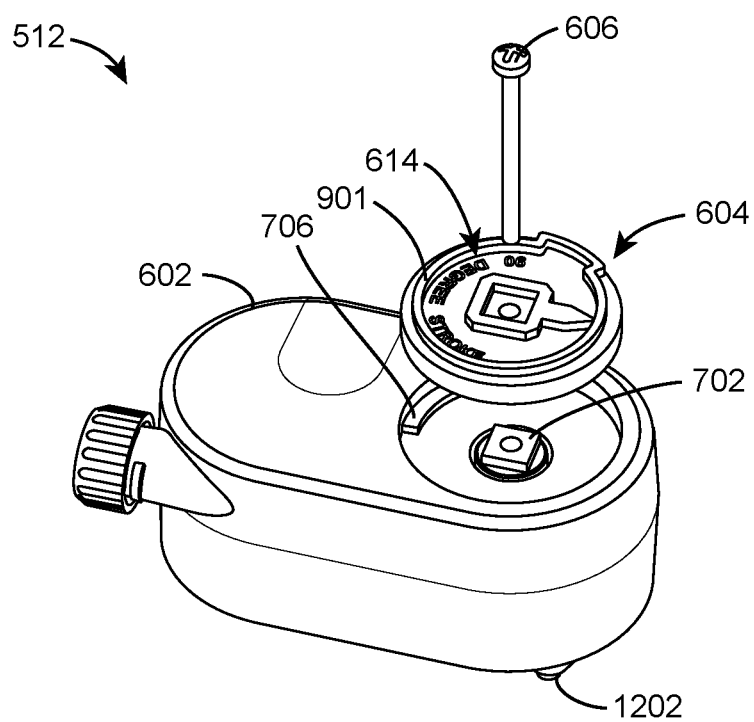
FIG. 12 is an exploded perspective view of the actuator including the stroke limiting component limiting a stroke of the actuator to 90 degrees, according to some embodiments.

Referring now to FIG. 12, a perspective exploded view of actuator 512 with stroke limiting component 604 limiting a stroke of actuator 512 to 90 degrees is shown, according to some embodiments. Actuator 512 is shown to include actuator housing 602, stroke limiting component 604, fastener 606, driver 702, protrusion 706, and a connection component 1202. Connection component 1202 can be any mounting structure required to connect actuator 512 to a valve, damper, fan, pump, or another device used in an HVAC system or a BMS so actuator 512 can move or reorient the respective component. Driver 702 can operate to move the position of the component that connection component 1202 is coupled to. Stroke limiting component 604 can include label 614. Label 614 can include words that correspond to the stroke of actuator 512 when the face on the opposite side of stroke limiting component 604 is setting the stroke of actuator 512.

Figure 13:
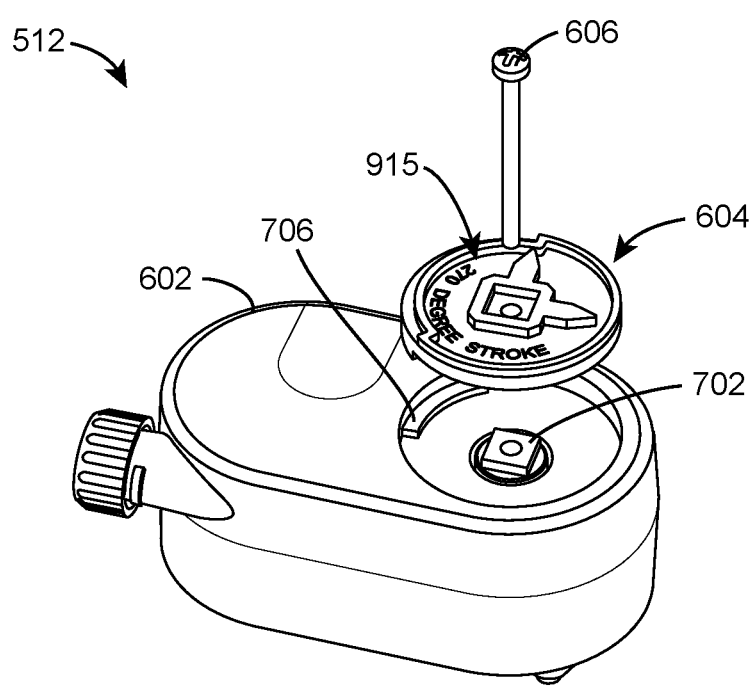
FIG. 13 is an exploded perspective view of the actuator of FIG. 12 including the stroke limiting component limiting the stroke of the actuator to 270 degrees, according to some embodiments.

Referring now to FIG. 13, a perspective exploded view of actuator 512 including stroke limiting component 604 limiting a stroke of the actuator 512 to 270 degrees is shown, according to some embodiments. FIG. 13 shows a similar view of actuator 512 to FIG. 12, but with stroke limiting component 604 flipped so actuator 512 has a larger stroke (e.g., a 270-degree stroke versus a 90-degree stroke). An operator can change an orientation (e.g., change which face is coupled to actuator housing 602) of stroke limiting component 604 by removing fastener 606 and removing stroke limiting component 604. The operator can flip stroke limiting component 604 and couple stroke limiting component 604 to actuator housing 602 in the flipped orientation by coupling fastener 606 to actuator housing 602 and stroke limiting component 604.

In some embodiments, sensors (not shown) can be coupled to or be a part of actuator 512. The sensors may be coupled to actuator body 602 or motor 618. The sensors may register a position (e.g., orientation) of stroke limiting component 604, a position of actuator 512, and/or an instance when end surface 610, 612, 920, or 922 contacts a face of protrusion 706. Stroke limiting component 604 may permit the driver to rotate between a first end position in which protrusion 706 contacts one of end surfaces 610, 612, 920, or 922 or a second end position in which protrusion 706 contacts another of end surfaces 610, 612, 920, or 922. The stroke may be defined by a length that stroke limiting component 604 can rotate before contacting one of end surfaces 610, 612, 920, or 922.

The sensors can transmit data to a controller (e.g., controller 502, a controller within actuator 512, etc.). The controller can receive a constant stream of data indicating instances when end surface 610, 612, 920, or 922 contact protrusion 706. In some embodiments, the sensors may send data when stroke limiting component 604 contacts protrusion 706. The controller can signal for motor 618 to rotate driver 702 (and thus, the stroke limiting component 604 coupled to driver 702) in the opposite direction. Controller 502 can signal for motor 618 to rotate in any direction at any point in time. In some embodiments, controller 502 can determine when to reverse a direction of rotation of stroke limiting component 604 upon receiving data indicating a level of resistance to stroke limiting component 604 rotating. A controller can indicate for motor 618 to stop rotating stroke limiting component 604 upon receiving data indicating that stroke limiting component 604 has contacted protrusion 706.

In some embodiments, the rotation of stroke limiting component 604 corresponds to an opening and/or closing of a valve. For example, a controller can operate actuator 512 to position a valve (e.g., valve assembly 501) in a plant (not shown). The valve can move from a full close position to a full open position after being rotated 270 degrees. Stroke limiting component 604 can be coupled to actuator housing 602 to set the stroke of an actuator operating the valve to 270 degrees. As the controller operates to open and close the valve, stroke limiting component 604 may rotate 270 degrees and contact protrusion 706 of actuator housing 602. The controller can receive data from sensors coupled to actuator 512 and stop rotation of the actuator when the data indicates stroke limiting component 604 contacted a protrusion of actuator 512. The controller can send a signal to actuator 512 indicating for actuator 512 to stop opening or closing the valve or for actuator 512 to reverse its operation to open or close the valve.

Figure 14:
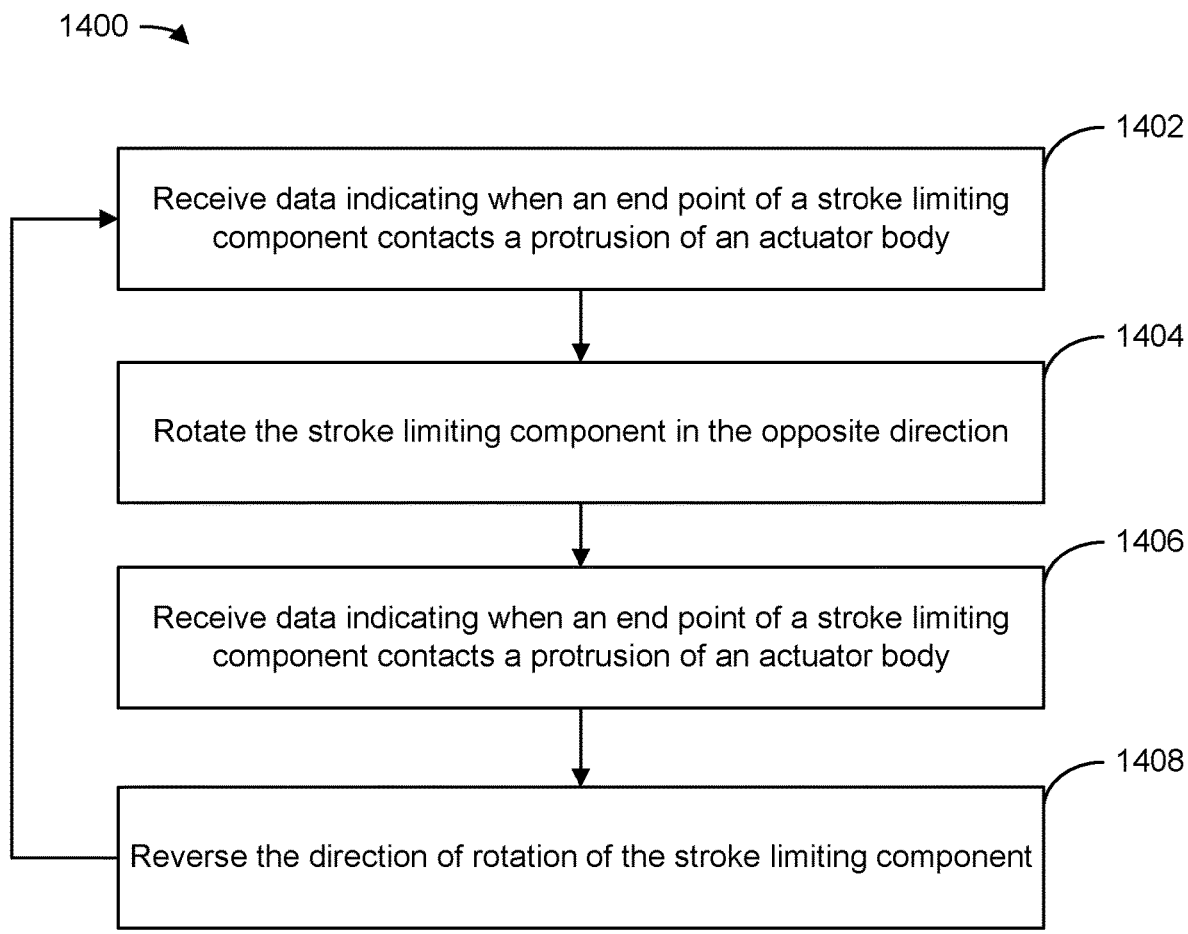
FIG. 14 is a flowchart of a process for controlling the stroke of the actuator based on an end surface of the stroke limiting component contacting a protrusion of the actuator, according to some embodiments.

Referring now to FIG. 14, a flowchart of a process 1400 for controlling an actuator based on a stroke limiting component contacting a protrusion of an actuator during rotation is shown, according to some embodiments. Process 1400 is shown to include receiving data indicating when an end surface of a stroke limiting component contacts a protrusion of an actuator housing (step 1402), rotating the stroke limiting component in the opposite direction (step 1404), receiving data indicating when an end surface of a stroke limiting component contacts a protrusion of an actuator housing (step 1406), and reversing the direction of rotation of the stroke limiting component (step 1408), in some embodiments. In addition to the steps described herein, process 1400 can include any number of steps and the steps can be performed in any order. In some embodiments, a controller (e.g., controller 502, a controller internal to an actuator, etc.) can be configured to perform one, some, or all of the steps 1402-1408.

At step 1402, the controller can receive data indicating when an end surface of a stroke limiting component contacts a protrusion of an actuator housing of an actuator. The actuator may be coupled to a valve, a damper, etc. The controller can receive the data after constantly polling sensors for the data or once sensors coupled to the actuator sense that the actuator has reached a stroke limit based on the stroke limiting component contacting the protrusion of the actuator housing. The stroke limit can be associated with a valve that has been fully opened or closed. For example, an actuator may have a stroke of 90 degrees. The 90-degree stroke may be correlated with how much the actuator needs to rotate so a valve attached to the actuator can be fully opened or closed.

At step 1404, the controller can rotate the stroke limiting component in the opposite direction. The controller can rotate the stroke limiting component by sending a signal to a motor indicating a rate and a direction to rotate the stroke limiting component. The motor can rotate the stroke limiting component based on the direction and size of the current sent from the controller. The controller can indicate for the motor to rotate the stroke limiting component until the stroke limiting component contacts the protrusion. At step 1406, the controller can receive data indicating when an end surface of a stroke limiting component contacts a protrusion of an actuator housing. The receipt of data at step 1406 may be substantially similar to step 1402. At step 1408, the controller can reverse the direction of rotation of the stroke limiting component. Step 1408 may be substantially similar to step 1404. In some instances, rather than reversing the direction of the motor and stroke limiting component at step 1408, the controller stops rotation of the motor and the stroke limiting component.

Figure 15:
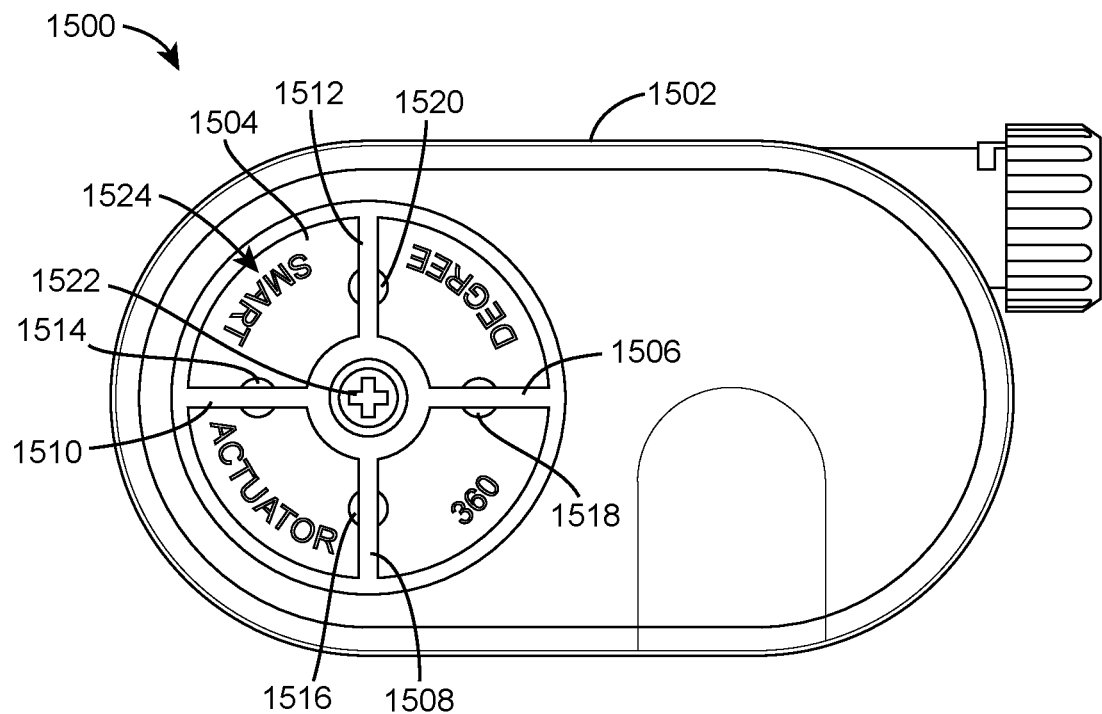
FIG. 15 is a front view of an actuator including a position identifying component, according to some embodiments.

Referring now to FIG. 15, a front view of an actuator 1500 having an actuator housing 1502 and a position identifying component 1504 permitting a 360 degree actuator stroke is shown, according to some embodiments. Actuator housing 1502 can be similar to actuator housing 602, shown and described with reference to FIG. 6. Actuator housing 1502 can be coupled to position identifying component 1504 through fastener 1522. Fastener 1522 can be similar to fastener 606. Actuator 1500 can be used to drive a driver (not shown) to control the orientation of a valve, a damper, etc. For example, actuator 1500 can operate valves including, but not limited to, a 90-degree ball valve and a 270-degree ball valve. In some instances, actuator 1500 can be used to reposition a valve that was installed incorrectly.

Position identifying component 1504 can be configured to rotate based on an operation of a motor (not shown) of actuator 1500. The motor may be similar to motor 618 shown and described with respect to FIG. 6. Position identifying component 1504 can rotate as the motor drives the driver (and the component the driver is moving) to a desired position. A rotational position of position identifying component 1504 can correspond to a position of the driver. Position identifying component 1504 is shown to include protrusions 1506, 1508, 1510, and 1512 at 90-degree increments around a center point of position identifying component 1504. Sensors or magnets 1514, 1516, 1518, and 1520 can be situated below protrusions 1506, 1508, 1510, and 1512. Each of magnets 1516, 1518, 1520, and 1522 can generate a magnetic field having a magnitude. Position identifying component 1504 can also include a label 1524 indicating a stroke limit of position identifying component 1504 (e.g., 360 degrees).

Magnets 1516, 1518, 1520, and 1522 may be exemplary markers. Markers may be any sort of device that can provide data to sensors that can be used by a controller to identify a position or orientation of position identifying component 1504. Another example of a marker may be a device that generates electric fields.

As will be discussed below, actuator 1500 can include sensors, such as hall sensors. The sensors may be coupled to actuator housing 1502. The hall sensors can measure a magnitude of a magnetic field generated by each of magnets 1516, 1518, 1520, and 1522 and send data associated with the magnetic field (e.g., the magnitude) to a controller (not shown). The controller can receive the data and determine a position of position identifying component 1504 based on the strength of the magnetic field. The controller can determine an output position of position identifying component 1504 based on locations of magnets 1516, 1518, 1520, and 1522. Further, because the output orientation of position identifying component 1504 can correspond to a position of the driver, the controller can determine a position of the driver based on the position of position identifying component 1504. In some embodiments, the controller can determine the output position (e.g., the position of the driver) of actuator 1500 using mechanical switches, inductive sensors, etc., that identify the position of the position identifying component 1504.

Figure 16:
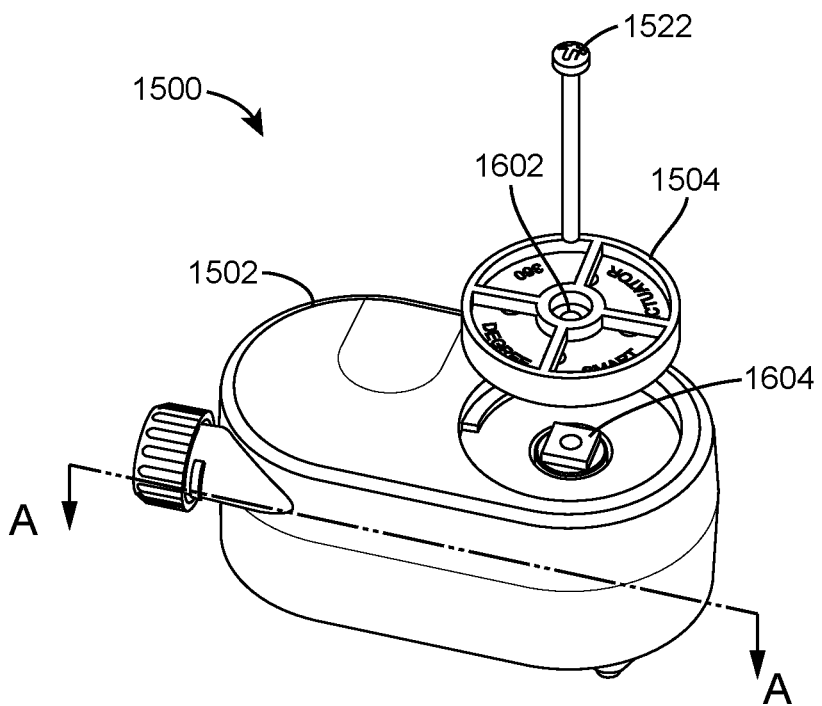
FIG. 16 is an exploded view of the actuator of FIG. 15 including the position identifying component, according to some embodiments.

Referring now to FIG. 16, an exploded view of actuator 1500 with actuator housing 1502 coupled to position identifying component 1504 permitting the stroke of actuator 1500 to be 360 degrees is shown, according to some embodiments. Actuator 1500 is shown to include position identifying component 1504, fastener 1522, and actuator housing 1502. In addition to having the components described above, position identifying component 1504 is shown to have a hole 1602. Hole 1602 can allow for fastener 1522 to couple with position identifying component 1504 and with a motor within actuator 1500. The motor can cause position identifying component 1504 to rotate corresponding to a movement of the driver. Fastener 1522 can supply a tensile force to keep position identifying component 1504 coupled to actuator housing 1502. A driver 1604 can couple with position identifying component 1504. Driver 1604 can be similar to driver 702. Driver 1604 can rotate as the motor within actuator 1500 operates and cause position identifying component 1504 to rotate.

Referring now to FIG. 17, a front view of a first face 1702 of position identifying component 1504 set to operate an actuator at a 360-degree stroke is shown, according to some embodiments. As described above, position identifying component 1504 is shown to include magnets 1514, 1516, 1518, and 1520 arranged in a radial pattern (e.g., a circular pattern) in 90-degree increments around position identifying component 1504. Each magnet 1514, 1516, 1518, and 1520 can generate a magnetic field having a magnitude. Sensors (not shown) coupled to actuator housing 1502 can sense the magnetic field generated by the magnet and the magnitude of the magnetic field and send data corresponding to the magnetic field to a controller (e.g., controller 502, an actuator controller internally coupled to actuator 1500, etc.). The controller can determine a position or an orientation of position identifying component 1504 with respect to actuator housing 1502 based on the data.

Referring now to FIG. 18, a side view of position identifying component 1504 is shown, according to some embodiments. The side view shows first face 1702, a position identifying component body 1704, and a second face 1706. Position identifying component body 1704 can include protrusions 1506, 1508, 1510, and 1512. Second face 1706 can include magnets 1514, 1516, 1518, and 1520. Second face 1706 can extend from position identifying component body 1704 so magnets 1514, 1516, 1518, and 1520 can be mounted within position identifying component body 1704 between first face 1702 and second face 1706.

Referring now to FIG. 19, a rear view of second face 1706 of position identifying component 1504 set to operate an actuator at a 360 degree stroke is shown, according to some embodiments. Second face 1706 is shown to include magnets 1514, 1516, 1518, and 1520, hole 1602, and drive receiving recess 1708. As discussed above, magnets 1514, 1516, 1518, and 1520 can produce magnetic fields sent to sensors on actuator housing 1502. Although FIGS. 17-19 depict the position identifying component 1504 as including four magnets 1514, 1516, 1518, and 1520, position identifying component 1504 may include any number of magnets or sensors, in any desired pattern. Driver 1604 can be sized to fit inside drive receiving recess 1708 so a rotation of driver 1604 correlates with a rotation of position identifying component 1504.

Figure 20:
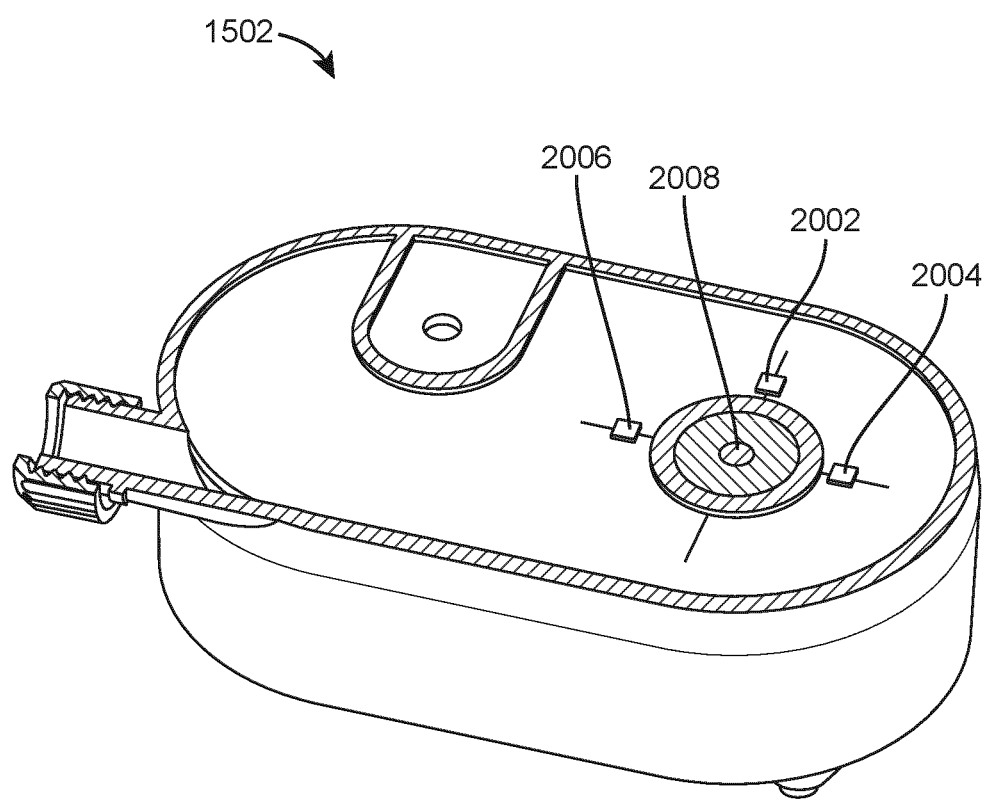
FIG. 20 is cross-sectional view of the actuator including sensors that help determine a position of the position identifying component taken about the line A-A of FIG. 16, according to some embodiments.

Referring now to FIG. 20, a cross-sectional view of actuator housing 1502 taken along the line A-A of FIG. 16 is shown, according to some embodiments. Actuator housing 1502 is shown to include a hole 2008 and position sensors 2002, 2004, and 2006. Hole 2008 can align with hole 1602 of position identifying component 1504 shown and described with reference to FIG. 16. Position sensors 2002, 2004, and 2006 can be configured to sense a location, or orientation, of position identifying component 1504 based on magnets 1514, 1516, 1518, and 1520 of position identifying component 1504. Actuator housing 1502 can include any number of position sensors 2002, 2004, and 2006.

Position sensors 2002, 2004, and 2006 may include Hall Effect sensors, potentiometers, optical sensors, or other types of sensors configured to measure the rotational position of position identifying component 1504. In some embodiments, position sensors 2002, 2004, and 2006 may provide position signals to a controller indicating an orientation of position identifying component 1504 in relation to position sensors 2002, 2004, and 2006. The controller can determine whether to operate a motor of actuator 1500 based on the position signals. For example, the controller can compare the current position of position identifying component 1504 with a position setpoint and may operate the motor to achieve the position setpoint.

In some embodiments, an administrator can set a desired stroke of actuator 1500 at a controller. The administrator can set the stroke to any stroke limit including stroke limits above 360 degrees. The controller can determine a position of the driver based on a number of rotations position identifying component 1504 rotates (e.g., a full rotation is 360 degrees). The controller can determine the number of rotations based on signals sent from sensors coupled to actuator 1500 that can sense magnetic fields and magnitudes from magnets of position identifying component 1504. The controller can identify each full rotation and the position of position identifying component 1504 to determine if actuator 1500 is at its stroke limit. If actuator 1500 is at a stroke limit, the controller can stop rotation of position identifying component 1504 and the driver and/or automatically reverse rotation depending on a desired operation of the actuator (e.g., whether the actuator is meant to fully open or close a valve or damper).

Figure 21:
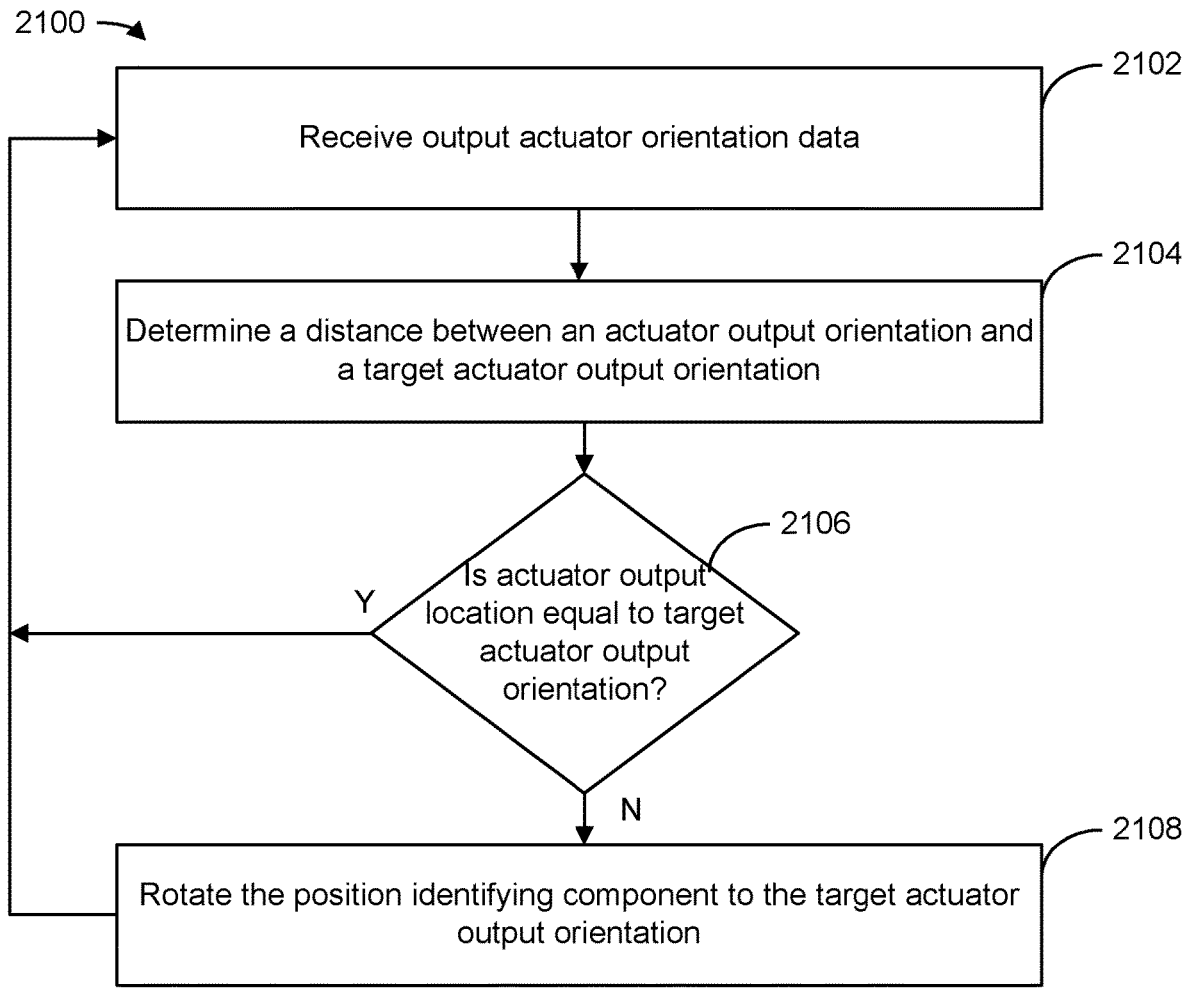
FIG. 21 is a flowchart of a process for controlling an output orientation of the actuator based on sensor input data, according to some embodiments.

Referring now to FIG. 21, a flowchart of a process 2100 for controlling an output orientation of an actuator (e.g., actuator 1500) based on sensor input data is shown, according to some embodiments. Process 2100 can be conducted by a controller (e.g., controller 502, a controller internally coupled to actuator 1500, etc.) and include any number of steps conducted in any order. Process 2100 can include receiving output actuator orientation data (2102), determining a distance between an actuator output orientation and a target actuator output orientation (2104), determining whether the actuator output orientation is equal to a target actuator output orientation (2106), and rotating the position identifying component to the target actuator output orientation (2108).

At step 2102, a controller can receive output actuator orientation data indicating a position of a position identifying component rotationally coupled to an actuator housing of an actuator. In some embodiments, the output actuator orientation data can be transmitted from sensors coupled to the actuator that sense a distance of a portion of the position identifying component from each respective sensor. For example, a position identifying component may include magnets arranged in 90-degree increments around the position identifying component. The magnets can generate a magnetic field. Sensors (e.g., hall sensors) coupled to an actuator housing coupled to the position identifying component can sense the magnetic field including the magnitude of the magnetic field generated by the magnets and send data including information about the magnetic field to a controller. The controller can receive the data from the sensors.

At step 2104, the controller can identify the data from the sensors and determine a distance between the sensors and respective portions of the position identifying component. In some embodiments, the controller can receive data from hall sensors sensing magnetic fields generated by magnets arranged on a position identifying component. The controller can determine the distance between the Hall sensors and the magnets based on a magnitude, or strength, of the magnetic field. The controller can determine stronger magnetic fields to be correlated with magnets that are closer to the sensors while weaker magnetic field correlate with magnets that are further away from the sensors. The controller can use an internal table to determine the orientation of the position identifying component based on the strength of the magnetic field sensed by the hall sensors. In some embodiments, the orientation of the position identifying component can correlate to an output position of the actuator (e.g., a position of a valve).

At step 2106, the controller can determine whether the actuator output orientation is equal to a target actuator output orientation. The target actuator output orientation can be set by an administrator. The target output orientation schedule can be an output orientation of an actuator so a component coupled to the actuator can operate as desired by the administrator. For example, for a plant including a system of valves to work properly, a particular valve may need to be fully open. The controller can receive data from sensors of an actuator controlling the valve indicating the valve is partially closed based on the orientation of a position identifying component of the actuator. The controller can compare the data to data associated with a fully open valve and determine the actuator output orientation is not equal to the target actuator output orientation of a fully open valve. If the controller determines the output orientation data to be equal to the target actuator output orientation, the controller may not do anything and wait for further data to restart process 2100 at step 2102. In some embodiments, the target actuator output orientation can be a part of an output orientation schedule that includes multiple output orientations of the actuator over a given time period. Step 2106 may be optional because the controller knows whether the actuator output orientation is equal to the target actuator output orientation based on the output orientation schedule.

At step 2108, if the controller determines the actuator output orientation is not equal to the target actuator output orientation, the controller can rotate the position identifying component to the target actuator output orientation. The controller can send a signal to a motor of the actuator indicating a direction of rotation of the position identifying component and a length of time to rotate the position identifying component to reach the target actuator output orientation. The motor in turn can drive the position identifying component to the position determined by the controller to be the target actuator output orientation. A driver, (e.g., a positioning member that rotates or positions a valve or a damper) can change positions correlating to the change in position of the position identifying component.

Figure 22:
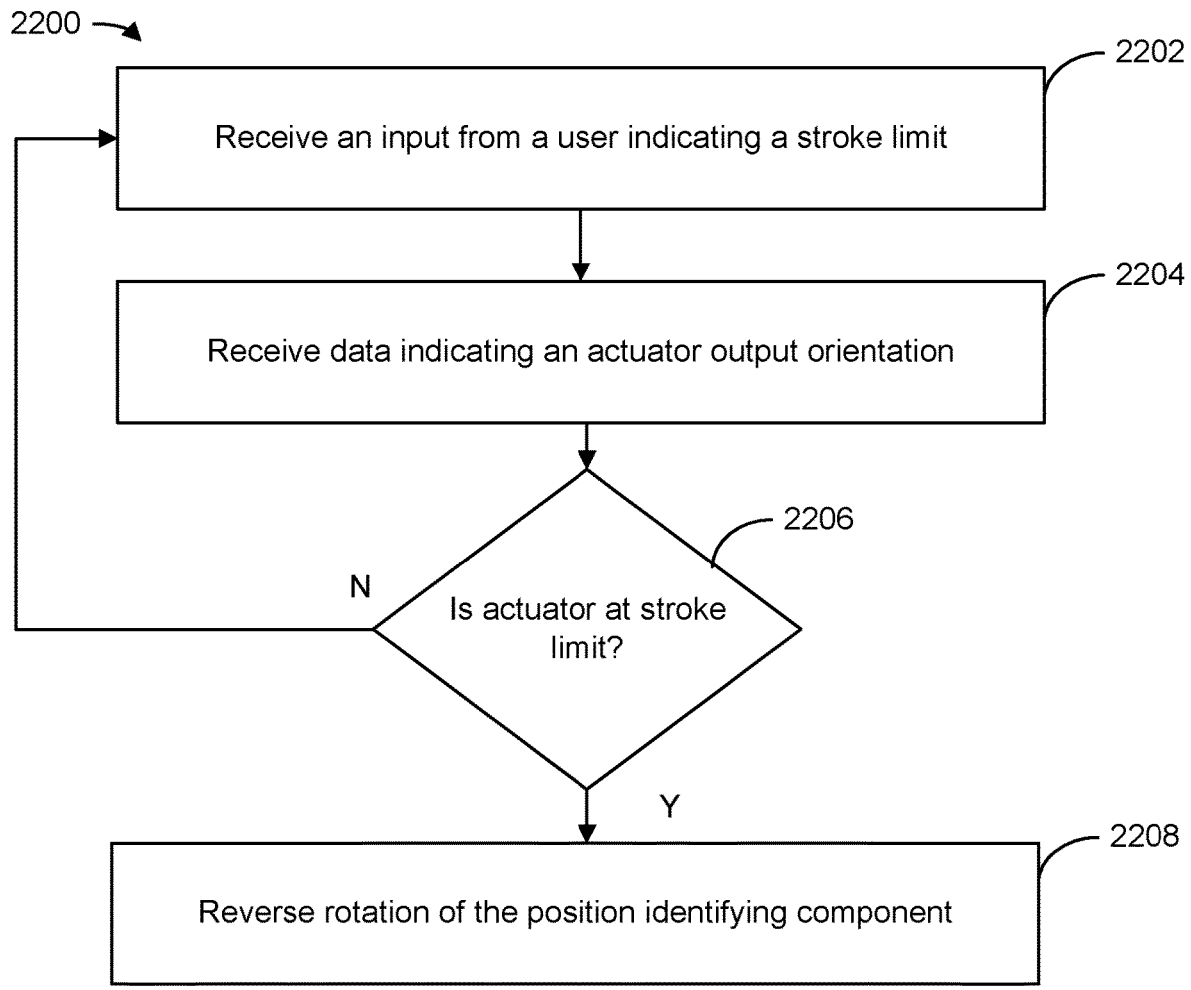
FIG. 22 is a flowchart of a process for controlling a rotation of the position identifying component based on data indicating an actuator output orientation of the actuator, according to some embodiments.

Referring now to FIG. 22, a flowchart of a process 2200 for controlling a rotation of a position identifying component based on data indicating an actuator output orientation is shown, according to some embodiments. Process 2200 can be conducted by a controller (e.g., controller 502, a controller internally coupled to actuator 1500, etc.) and can include any number of steps conducted in any order. Process 2200 can include receiving an input from a user indicating a stroke limit (2202), receiving data indicating an actuator output orientation (2204), determining whether the actuator is at a stroke limit (2206), and reversing rotation of the position identifying component (2208).

At step 2202, a controller can receive an input from a user (e.g., an administrator) indicating a stroke limit of an actuator. The stroke limit can be any stroke. The administrator can select a stroke limit based on a desired operation of the actuator. For example, the actuator may be controlling a 90-degree ball valve. The administrator may input a 90-degree stroke limit into the controller so the actuator can open and close the ball valve without overshooting the fully opened and fully closed positions of the valve.

At step 2204, the controller can receive data indicating an actuator output orientation 2204 of the actuator. The actuator output orientation can indicate a valve position (e.g., in percentage open) and can correspond to an orientation of a position identifying component coupled to an actuator housing of the actuator. As described above with reference to FIG. 2100, the controller can determine the output orientation of the actuator based on data sensed by sensors coupled to the actuator housing from magnets of the position identifying component. The controller can receive a continuous stream of data indicating an orientation of the position identifying component.

At step 2206, the controller can determine whether the actuator is at the stroke limit as set by the administrator. The controller can compare the stroke limit with the current output orientation of the actuator based on the orientation of the position identifying component. The controller can constantly monitor the orientation of the position identifying component. If the actuator is not at the administrator-set stroke limit, the controller can continue to rotate the position identifying component and return to step 2202 of process 2200. If the actuator is at the administrator set stroke limit, at step 2208, the controller can send a signal to the motor to reverse rotation of the position identifying component. In some instances, the controller may instruct the motor to stop rotation of the position identifying component rather than reversing rotation.

Figure 23:
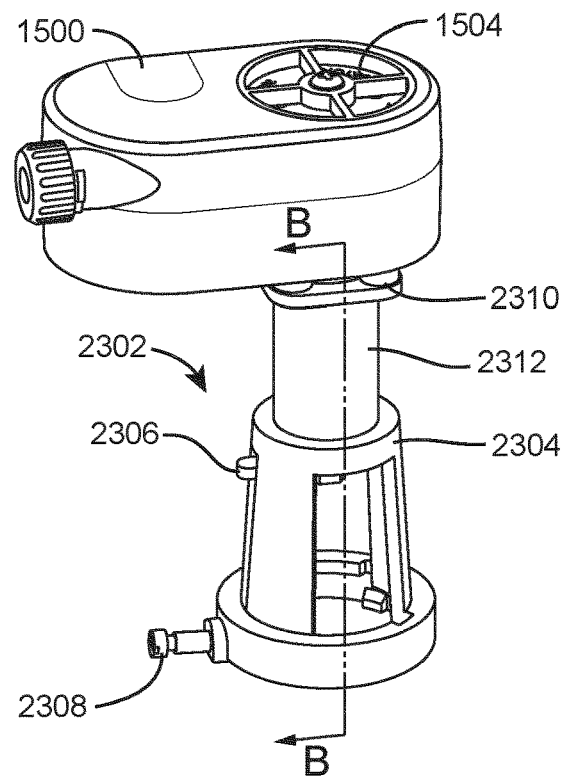
FIG. 23 is a perspective view of the actuator coupled to a globe valve linkage, according to some embodiments.

Referring now to FIG. 23, a perspective view of actuator 1500 with a 360-degree stroke limit coupled to a globe valve linkage 2302 is shown, according to some embodiments. Actuator 1500 is shown to include position identifying component 1504, shown and described with reference to FIG. 15 above. In other embodiments, actuator 1500 can include a stroke limiting component (e.g., stroke limiting component 604, described above with reference to FIG. 6) in place of the position identifying component 1504.

Globe valve linkage 2302 is shown to include a base 2304, an end stop 2306, a position screw 2308, a connection platform 2310, and a screw column 2312. In some embodiments, base 2304 can be configured to operationally couple globe valve linkage 2302 with a valve (not shown). An operator can place base 2304 over the valve and turn position screw 2308 to keep the valve in place within base 2304.

Actuator 1500 can be configured to rotate a screw (e.g., a lead screw) shown and described below with reference to FIG. 24, and cause a stem to move perpendicular to actuator 1500. Actuator 1500 can rotate the screw by rotating a liner within screw column 2312, which rotates relative to connection platform 2310 and position identifying component 1504 in response to operation of a motor of actuator 1500. The screw can be coupled to end stop 2306, which can contact base 2304 as liner 2318 rotates. The screw can rotate relative to screw column 2312 and push the stem up or down relative to actuator 1500.

In some embodiments, base 2304 is connected to a valve. By pushing the stem up or down, the stem can restrict or allow gas or liquid to flow through the valve. If the stem is pushed at a maximum length downward, the stem can plug the valve and not allow gas or fluid to flow through the valve. In contrast, if the stem is at a maximum length upward, fluid or gas can flow through the valve at a maximum flow rate as the stem minimally restricts fluid or gas flow. In some embodiments, actuator 1500 can operate the stem to control fluid in multiple pipes in a 3-way operation.

Advantageously, by using position identifying component 1504 of actuator 1500 to regulate the stroke of actuator 1500, a controller can set the stroke of actuator 1500 to any stroke including strokes above 360 degrees. By doing so, actuator 1500 can fully rotate liner 2318 any number of times to raise or lower the stem to open and close a valve. A controller (not shown) can control a maximum number of rotations by setting the stroke of the actuator and ensuring position identifying component 1504 does not rotate above the maximum number of rotations.

For example, if it takes two rotations of the screw to close a valve with a stem, an administrator can set the stroke of actuator 1500 to 720 degrees. The controller can determine how many rotations the screw has been turned based on the number of rotations that position identifying component 1504 has made. The controller can determine the number of rotations of position identifying component 1504 based on the data sent from sensors of actuator 1500 identifying how close magnets of position identifying component 1504 are to sensors coupled to actuator 1500. The controller can receive data indicating each rotation of position identifying component 1504 and either stop or reverse rotation of the screw when the actuator has reached the stroke limit.

Figure 24:
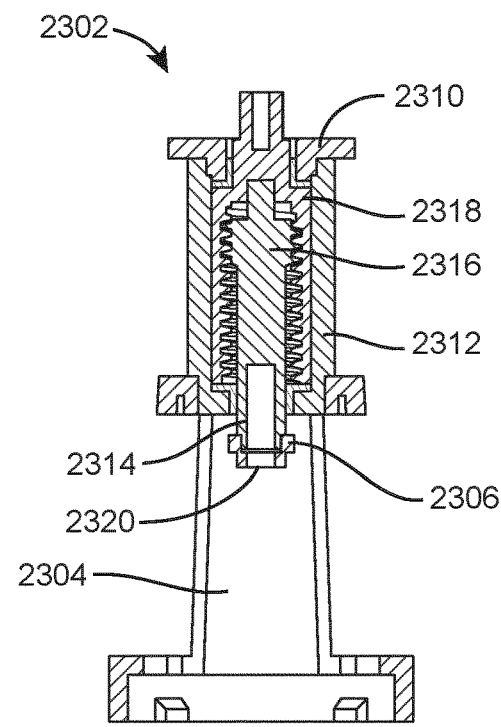
FIG. 24 is a partial cross-sectional view of a base of the globe valve linkage taken about the line B-B of FIG. 23, according to some embodiments.

Referring now to FIG. 24, a partial cross-sectional view of globe valve linkage 2302 taken along the line B-B of FIG. 23 is shown, according to some embodiments. Globe valve linkage 2302 is shown to include connection platform 2310, a screw 2316, a liner 2318, a coupler 2320, a stem 2314, end stop 2306, and base 2304. As described above, liner 2318 can rotate based on a rotation of a driver connected to a motor of actuator 1500. As liner 2318 rotates, screw 2316 can rotate and cause stem 2314 to move up or down depending on the direction of rotation of screw 2316.

Stem 2314 can be coupled to end stop 2306 by coupler 2320. End stop 2306 can rotate corresponding to the rotation of screw 2316. As described above, however, as end stop 2306 rotates, end stop 2306 may contact base 2304, preventing end stop 2306 from rotating. Liner 2318 may continue rotating, however, which causes stem 2314 to move perpendicular to actuator 1500.

Figure 25:
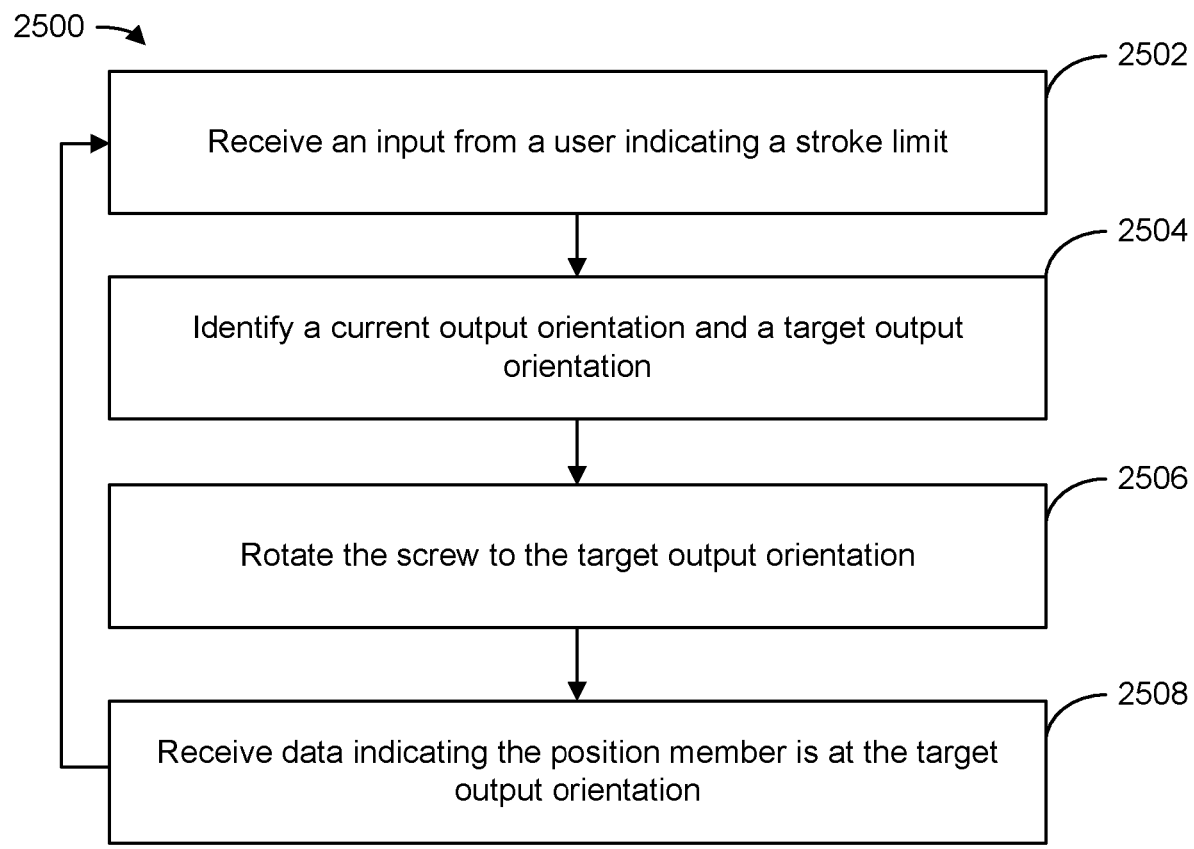
FIG. 25 is a flowchart of a process for controlling a screw of the globe valve linkage with an actuator, according to some embodiments.

Referring now to FIG. 25, a flowchart of a process 2500 for controlling a stem of a globe valve linkage with a 360-degree stroke actuator is shown, according to some embodiments. Process 2500 can be conducted by a controller (e.g., controller 502, a controller internally coupled to actuator 1500, etc.) and include any number of steps conducted in any order. In some embodiments, the controller may be operating to open and/or close a valve coupled to the actuator by a globe valve linkage. Process 2500 can include receiving an input from a user indicating a stroke limit (2502), identifying a current output orientation and a target output orientation (2504), rotating a screw to the target output orientation (2506), and receiving data indicating the screw is at the target output orientation (2508).

At step 2502, the controller can receive an input from a user indicating a stroke limit of the actuator operating to open or close a valve with the stem. The stroke limit can be associated with an amount of rotations a screw that forces a stem up or down can perform to fully open or close a valve. The stroke limit can be based on the pitch of the screw. In some embodiments, the screw may be fully extended at the stroke limit, and can cause the stem to fully stop liquid or gas from flowing through the valve.

At step 2504, the controller can identify a current output orientation and a target output orientation 2504 of the actuator based on an operation of a valve. The current output orientation can be determined based on the position of magnets of a position identifying component in relation to one or more sensors coupled to an actuator. The current output orientation can also be determined based on the number of rotations the controller has determined the position identifying component has performed within the stroke limit of the actuator. The target output orientation can be a desired position of a valve determined based on a user input, based on a schedule, or based on other data sent to the controller. The controller can identify the target output orientation and, at step 2506, can rotate the driver of the actuator so a desired amount of liquid and/or fluid can flow through the valve.

At step 2508, the controller can receive data indicating the driver is at the target output orientation. The controller can receive the data from the sensors coupled to the actuator sensing an orientation of the position identifying component of the actuator. The controller can stop the actuator from rotating the screw once the driver is at the target output orientation and rotate the screw upon receiving data indicating a new target output orientation.

In one embodiment, an actuator can be a part of a system that includes a plurality of the stroke limiting components (e.g., stroke limiting component 604) as described herein. The stroke limiting components may be interchangeable stroke limiting disks. The interchangeable stroke limiting disks may include a position identifying component similar to position identifying component 1504. Each of the stroke limiting disks may have one or more faces associated with a different stroke range. Each face can couple to the actuator and be configured to limit a stroke range of the actuator to the stroke range associated with the face.

In some embodiments, one of the stroke limiting disks may have a first face with a first channel having a first length configured to limit the stroke range of the actuator to a first stroke range (e.g., 270 degrees) and a second face with a second channel having a second length. The second channel may be configured to limit the stroke range of the actuator to a second stroke range (e.g., 90 degrees). An operator may detach, flip, and attach the stroke limiting disk to change the stroke range of the actuator.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the HVAC actuator and assembly thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An actuator comprising:
   an actuator housing having a first engagement feature;
   a driver;
   a motor located within the actuator housing and configured to rotate the driver; and
   a stroke limiting component coupled to the driver and having a second engagement feature,
   wherein one of the first and second engagement features is a channel and another of the first and second engagement features is a protrusion, the protrusion configured to fit within the channel to define a stroke of the actuator based at least in part on a length of the channel or a length of the protrusion.

2. The actuator of claim 1, wherein the stroke limiting component is removably coupled to the driver.

3. The actuator of claim 1, wherein the first engagement feature is located on an exterior face of the actuator housing.

4. The actuator of claim 1, wherein the stroke limiting component has a first face having a first channel having a first length associated with a first stroke and a second face having a second channel having a second length associated with a second stroke, wherein the first length is different from the second length.

5. The stroke limiting component of claim 4, wherein the first face is associated with a 270-degree stroke and the second face is associated with a 90-degree stroke.

6. The actuator of claim 1, wherein the channel is arcuate.

7. The actuator of claim 1, wherein the stroke limiting component permits the driver to rotate between a first end position in which the protrusion contacts a first end surface of the channel and a second end position in which the protrusion contacts a second end surface of the channel.

8. The actuator of claim 1, wherein the stroke is defined based on a face of the protrusion contacting a first end surface of the channel or a second end surface of the channel as the stroke limiting component rotates.

9. The actuator of claim 8, further comprising:
   an actuator controller operationally coupled to the motor and comprising a processor and a memory, the memory storing instructions that, when executed by the processor, cause the processor to perform operations to control an orientation of the stroke limiting component, the operations comprising:
      receiving data from a sensor located within the actuator housing indicating when the first end surface or the second end surface contacts the protrusion during a rotation of the stroke limiting component; and
      in response to the first end surface or the second end surface of the channel contacting the protrusion, rotating the stroke limiting component in an opposite direction.

10. The actuator of claim 1, wherein an orientation of the stroke limiting component represents an output actuator orientation.

11. An actuator comprising:
   an actuator housing;
   a driver;
   a motor internally coupled to the actuator housing and the driver and configured to adjust a position of the driver;

a circular disk operationally coupled to the motor and configured to rotate in relation to an operation of the motor and the position of the driver, wherein the circular disk comprises one or more markers;

one or more sensors coupled to the actuator housing and configured to detect a position of the one or more markers; and an actuator controller operationally coupled to the motor and configured to adjust operation of the motor to adjust the position of the driver, the actuator controller comprising a processor and a memory, the memory storing instructions that, when executed by the processor, cause the processor to perform operations to control an orientation of the circular disk, the operations comprising:

receiving output actuator orientation data from the one or more sensors based on the orientation of the circular disk;

determining a rotation distance between an actuator output orientation and a target actuator orientation based on the output actuator orientation data; and rotating the circular disk based on the rotation distance.

12. The actuator of claim 11, wherein the one or more sensors are Hall effect sensors and the actuator further comprises magnets coupled to the circular disk, wherein determining the rotation distance between the actuator output orientation and the target actuator orientation is based on a distance between the magnets and the Hall effect sensors.

13. The actuator of claim 11, wherein the one or more sensors are coupled to the actuator housing in a radial pattern at 90-degree increments.

14. The actuator of claim 11, wherein the circular disk is configured to rotate by greater than 360 degrees.

15. The actuator of claim 11, wherein the operations further comprise:

receiving an input indicating a stroke limit, and rotating the circular disk to the stroke limit.

16. The actuator of claim 11, wherein the operations further comprise:

receiving an input indicating a stroke limit of the actuator; and automatically reversing rotation of the circular disk when the one or more sensors indicate the circular disk is at the stroke limit.

17. The actuator of claim 11, further comprising:

a screw operationally coupled to the motor, wherein the operations further comprise operating the motor to rotate the screw corresponding to a rotation of the circular disk.

18. A system comprising:

an actuator; and a plurality of interchangeable stroke limiting disks, each stroke limiting disk of the plurality of interchangeable stroke limiting disks configured to be disposed at a face of the actuator and configured to limit a stroke range of the actuator to a different stroke range.

19. A system comprising:

an actuator; and a plurality of interchangeable stroke limiting disks, each stroke limiting disk of the plurality of interchangeable stroke limiting disks configured to couple to a face of the actuator and configured to limit a stroke range of the actuator to a different stroke range, wherein one stroke limiting disk of the plurality of stroke limiting disks comprises:

a first face having a first channel having a first length configured to limit the stroke range of the actuator to a first stroke range; and a second face having a second channel having a second length configured to limit the stroke range of the actuator to a second stroke range, wherein the first length is different from the second length.

20. The system of claim 19, wherein the first face is associated with a 270-degree stroke range and the second face is associated with a 90-degree stroke range.

21. The system of claim 18, wherein the face is an exterior face of a housing of the actuator and wherein a stroke limiting disk of the plurality of interchangeable stroke limiting disks is further configured to be disposed at the face of the actuator so the stroke limiting disk can be interchanged without detachment of the housing from the actuator.

\* \* \* \* \*